(12) United States Patent
Sakai et al.

(10) Patent No.: US 10,289,271 B2
(45) Date of Patent: May 14, 2019

(54) INFORMATION PROCESSING DEVICE AND INFORMATION PROCESSING METHOD FOR DISPLAYING MENU WITH ORTHOGONAL SUB-MENUS

(71) Applicant: SONY CORPORATION, Tokyo (JP)

(72) Inventors: Toshiyuki Sakai, Nagano (JP); Teruya Kaneda, Nagano (JP); Anna Ariga, Nagano (JP); Shunichi Sugiura, Nagano (JP); Hiroyuki Mitsubori, Nagano (JP)

(73) Assignee: SONY CORPORATION, Tokyo (JP)

( * ) Notice: Subject to any disclaimer, the term of this patent is extended or adjusted under 35 U.S.C. 154(b) by 101 days.

(21) Appl. No.: 14/899,843

(22) PCT Filed: Jun. 12, 2014

(86) PCT No.: PCT/JP2014/065649
§ 371 (c)(1),
(2) Date: Dec. 18, 2015

(87) PCT Pub. No.: WO2015/005059
PCT Pub. Date: Jan. 15, 2015

(65) Prior Publication Data
US 2016/0139741 A1    May 19, 2016

(30) Foreign Application Priority Data

Jul. 9, 2013 (JP) .................................. 2013-143705

(51) Int. Cl.
*G06F 3/0481* (2013.01)
*G06F 3/0482* (2013.01)
(Continued)

(52) U.S. Cl.
CPC ........ *G06F 3/0482* (2013.01); *G06F 3/04817* (2013.01); *G06F 3/04847* (2013.01);
(Continued)

(58) Field of Classification Search
CPC .............. G06F 3/04817; G06F 3/0482; G06F 3/04883; G06F 2203/04807; G06F 3/04886; G06F 9/451; G06F 2203/04808
See application file for complete search history.

(56) References Cited

U.S. PATENT DOCUMENTS 7,117,450 B1    10/2006   Chaudhri
2003/0019175 A1  1/2003   Kremers
(Continued)

FOREIGN PATENT DOCUMENTS

CN       102436338 A      5/2012
CN       102713821 A     10/2012
(Continued)

OTHER PUBLICATIONS

Extended European Search Report of EP Patent Application No. 14823150.9, dated Feb. 1, 2017, 13 pages.
(Continued)

*Primary Examiner* — Aaron Lowenberger
(74) *Attorney, Agent, or Firm* — Chip Law Group

(57) ABSTRACT

Provided is an information processing device including: a detection unit configured to detect a position of a manipulating object, and a display control unit configured to cause a menu to be displayed on a screen according to the position of the manipulating object detected by the detection unit. The display control unit causes, when the detection unit detects that the manipulating object is positioned on a first icon serving as a base point, one or more second icons corresponding to a main menu to be opened and displayed, and causes, when the detection unit detects that the manipulating object is positioned on one of the second icons, one or more third icons corresponding to a sub-menu subordinate to the main menu to be opened in a direction orthogonal to an
(Continued)

opening direction of the second icons and displayed by using the selected second icon as a base point.

15 Claims, 22 Drawing Sheets

(51) Int. Cl.
  *G06F 3/0484* (2013.01)
  *G06F 3/0488* (2013.01)
  *G06F 9/451* (2018.01)
(52) U.S. Cl.
  CPC ...... *G06F 3/04883* (2013.01); *G06F 3/04886* (2013.01); *G06F 9/451* (2018.02); *G06F 2203/04807* (2013.01); *G06F 2203/04808* (2013.01)

(56) References Cited

U.S. PATENT DOCUMENTS

| | | | | |
|---|---|---|---|---|
| 2004/0095395 | A1* | 5/2004 | Kurtenbach | G06F 3/0482 715/810 |
| 2004/0183836 | A1* | 9/2004 | Pagan | G06F 3/0482 715/810 |
| 2007/0157089 | A1* | 7/2007 | Van Os | G06F 3/04817 715/702 |
| 2007/0198949 | A1* | 8/2007 | Rummel | G06F 3/0482 715/810 |
| 2008/0163119 | A1* | 7/2008 | Kim | G06F 3/04886 715/840 |
| 2008/0165136 | A1* | 7/2008 | Christie | G06F 3/0482 345/173 |
| 2008/0244454 | A1* | 10/2008 | Shibaike | G06F 3/0482 715/835 |
| 2009/0291707 | A1* | 11/2009 | Choi | H04N 5/2257 455/556.1 |
| 2010/0088634 | A1* | 4/2010 | Tsuruta | G06F 3/0481 715/800 |
| 2010/0192102 | A1 | 7/2010 | Chmielewski et al. | |
| 2010/0306702 | A1* | 12/2010 | Warner | G06F 3/04817 715/811 |
| 2010/0313158 | A1 | 12/2010 | Lee et al. | |
| 2011/0066981 | A1 | 3/2011 | Chmielewski et al. | |
| 2011/0074718 | A1 | 3/2011 | Yeh et al. | |
| 2011/0179376 | A1* | 7/2011 | Berestov | G06F 3/017 715/779 |
| 2012/0297342 | A1* | 11/2012 | Jang | G06F 3/04817 715/823 |
| 2013/0019175 | A1* | 1/2013 | Kotler | G06F 3/0482 715/728 |
| 2013/0055142 | A1 | 2/2013 | Li | |
| 2013/0104079 | A1 | 4/2013 | Yasui et al. | |

FOREIGN PATENT DOCUMENTS

| | | |
|---|---|---|
| EP | 2416234 A2 | 2/2012 |
| JP | 2009-157800 A | 7/2009 |
| JP | 2011-243061 A | 12/2011 |
| JP | 2012-037978 A | 2/2012 |

OTHER PUBLICATIONS

Office Action for JP Patent Application No. 2015-526228, dated Feb. 6, 2018, 06 pages of Office Action and 04 pages of English Translation.

Office Action for CN Patent Application No. 201480037940.6, dated Jun. 28, 2016, 07 pages of Office Action and 11 pages of English Translation.

Office Action of JP Patent Application No. 2015-526228, dated May 29, 2018, 06 pages of Office Action and 04 pages of English Translation.

\* cited by examiner

INFORMATION PROCESSING DEVICE AND INFORMATION PROCESSING METHOD FOR DISPLAYING MENU WITH ORTHOGONAL SUB-MENUS

TECHNICAL FIELD

The present disclosure relates to an information processing device, an information processing method, and a computer program.

BACKGROUND ART

In an application which operates in a personal computer (PC), menus to be manipulated by a user are often displayed in one column in advance. When the user selects one menu from among the displayed menus in this application, an operation in which sub-menus belonging to the menu are displayed under the menu is generally performed (for example, see Patent Literature 1, etc.).

CITATION LIST

Patent Literature

Patent Literature 1: JP 2009-157800A

SUMMARY OF INVENTION

Technical Problem

Recently, the spread of high-function mobile phones (also referred to as smartphones) and tablet type portable terminals (also referred to simply as tablet terminals) equipped with a touch panel on a screen has progressed. Because users are assumed to directly manipulate the screens of such devices with a finger, a stylus pen, or the like, it is necessary to improve manipulability for users while efficiently displaying menus on the screen.

Therefore, the present disclosure provides a novel and improved information processing device, information processing method, and computer program capable of improving manipulability for a user while efficiently displaying menus on a screen.

Solution to Problem

According to the present disclosure, there is provided an information processing device including: a detection unit configured to detect a position of a manipulating object; and a display control unit configured to cause a menu to be displayed on a screen according to the position of the manipulating object detected by the detection unit. The display control unit causes, when the detection unit detects that the manipulating object is positioned on a first icon serving as a base point, one or more second icons corresponding to a main menu to be opened on at least four sides of the first icon and displayed, and causes, when the detection unit detects that the manipulating object is positioned on one of the second icons, one or more third icons corresponding to a sub-menu subordinate to the main menu to be opened in a direction orthogonal to an opening direction of the second icons and displayed by using the selected second icon as a base point.

According to the present disclosure, there is provided an information processing method including: detecting a position of a manipulating object; and causing a menu to be displayed on a screen according to the position of the manipulating object detected. Causing the menu to be displayed includes causing, when it is detected that the manipulating object is positioned on a first icon serving as a base point in the detecting step, one or more second icons corresponding to a main menu to be opened on at least four sides of the first icon and displayed, and causing, when it is detected that the manipulating object is positioned on one of the second icons in the detecting step, one or more third icons corresponding to a sub-menu subordinate to the main menu to be opened in a direction orthogonal to an opening direction of the second icons and displayed by using the selected second icon as a base point.

According to the present disclosure, there is provided a computer program for causing a computer to execute: detecting a position of a manipulating object; and causing a menu to be displayed on a screen according to the position of the manipulating object detected. Causing the menu to be displayed includes causing, when it is detected that the manipulating object is positioned on a first icon serving as a base point in the detecting step, one or more second icons corresponding to a main menu to be opened on at least four sides of the first icon and displayed, and causing, when it is detected that the manipulating object is positioned on one of the second icons in the detecting step, one or more third icons corresponding to a sub-menu subordinate to the main menu to be opened in a direction orthogonal to an opening direction of the second icons and displayed by using the selected second icon as a base point.

Advantageous Effects of Invention

As described above, according to the present disclosure, a novel and improved information processing device, information processing method, and computer program capable of improving manipulability for a user while efficiently displaying menus on a screen can be provided.

DESCRIPTION OF EMBODIMENTS

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

In addition, description will be provided in the following order.

<1. Embodiment of present disclosure>
[Functional configuration example of information processing device]
[Operation example of information processing device]
[Display example of icons]
<2. Hardware configuration example>
<3. Conclusion>

1. EMBODIMENT OF PRESENT DISCLOSURE

Functional Configuration Example of Information Processing Device

Figure 1:
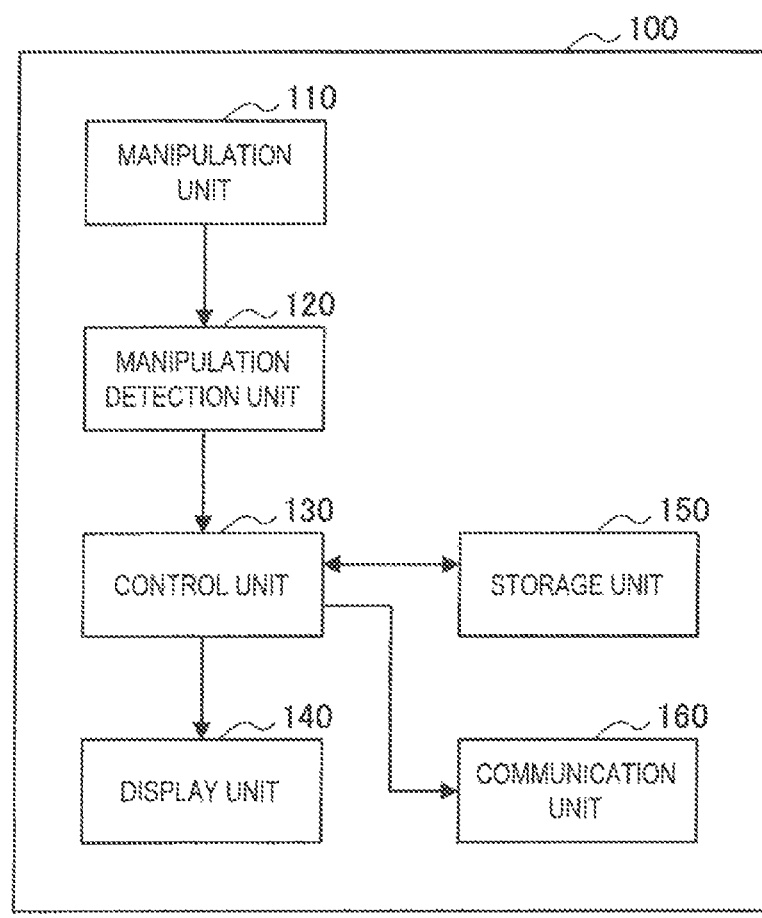
FIG. 1 is an explanatory diagram illustrating a functional configuration example of an information processing device 100 according to an embodiment of the present disclosure.

First, a functional configuration example of a display device according to an embodiment of the present disclosure will be described with reference to the drawings. FIG. 1 is an explanatory diagram illustrating a functional configuration example of an information processing device 100 according to an embodiment of the present disclosure. Hereinafter, the functional configuration example of the information processing device 100 according to the embodiment of the present disclosure will be described using FIG. 1.

The information processing device 100 according to the embodiment of the present disclosure illustrated in FIG. 1 is configured to receive a manipulation by allowing a user to touch a screen with a finger or the like, for example, as in a smartphone, a tablet terminal, a game machine, etc. As illustrated in FIG. 1, the information processing device 100 according to the embodiment of the present disclosure is configured to include a manipulation unit 110, a manipulation detection unit 120, a control unit 130, a display unit 140, a storage unit 150, and a communication unit 160.

The manipulation unit 110 receives a manipulation from the user on the information processing device 100. In this embodiment, a touch panel provided to be integrated with the manipulation unit 110 on the surface of the display unit 140 or on the display unit 140 may be used. In addition to the touch panel provided to be integrated with the manipulation unit 110 on the surface of the display unit 140 or on the display unit 140, hard keys or buttons may be used. The user's manipulation performed on the manipulation unit 110 is detected by the manipulation detection unit 120.

In the following description, unless otherwise specified, the manipulation unit 110 will be described assuming that the touch panel provided to be integrated with the manipulation unit 110 on the surface of the display unit 140 or on the display unit 140 is included.

The manipulation detection unit 120 detects content of the user's manipulation performed on the manipulation unit 110. For example, when the user touches the manipulation unit 110 with a finger or brings the finger in proximity to the manipulation unit 110 at less than a fixed distance, the manipulation detection unit 120 can detect coordinates of a position touched by the user with the finger or a position to which the user brings the finger in proximity, a change amount of a touch or proximity position, a change speed, the number of touch or proximity points, etc. When content of the user's manipulation performed on the manipulation unit 110 is detected, the manipulation detection unit 120 sends a detection result to the control unit 130.

The control unit 130 controls execution of an application saved in the information processing device 100 and display of text, an image, and other information for the display unit 140. When the result of detecting the content of the user's manipulation performed on the manipulation unit 110 is received from the manipulation detection unit 120, the control unit 130 controls the display of the text, the image, and the other information for the display unit 140 based on the detection result. Accordingly, the control unit 130 can function as an example of a display control unit of the present disclosure.

Although a control example of the display on the display unit 140 by the control unit 130 will be described in detail below, a simple description will be provided here. The user of the information processing device 100 is assumed to execute the manipulation for causing the information processing device 100 to execute a predetermined application using the manipulation unit 110. According to activation of the application, the information processing device 100 displays a menu for manipulating the application on the display unit 140.

In this embodiment, the menu for manipulating the application is assumed to be displayed in the form of a square icon. In addition, one icon is displayed at the time of the activation of the application and the icon is also referred to as a basic icon. In addition, the basic icon corresponds to an example of a first icon of the present disclosure.

When the user brings the finger or the like in contact with the square basic icon or in proximity to the square basic icon at less than a predetermined distance, the information processing device 100 opens other icons on all four sides from the basic icon and displays them on the display unit 140. The icons opened from all four sides of the basic icon and displayed are also referred to as menu icons. The menu icon corresponds to an example of a second icon of the present disclosure.

Then, when the user selects one menu icon from among the menu icons opened on all four sides from the basic icon and displayed, the information processing device 100 opens icons for executing functions belonging to a menu corresponding to the selected menu icon from the selected menu icon to display the opened icons on the display unit 140. Displayed icons opened from the menu icon are also referred to as function icons. The function icon corresponds to an example of a third icon of the present disclosure.

The manipulation detection unit 120 and the control unit 130 operate as described above, so that the information processing device 100 can cause the display unit 140 to efficiently display the menu. A display example of the basic icon, the menu icons, and the function icons will be described in detail below.

The display unit 140 displays text, an image, and other information. The display unit 140 is controlled to display the text, the image, and the other information by the control unit 130. In the display unit 140, for example, a liquid crystal display, an organic electroluminescence (EL) device, or the like can be used. As described above, a touch panel integrated with the surface of the display unit 140 or the display unit 140 can be provided.

In this embodiment, the display unit 140 displays the basic icon, the menu icons, and the function icons according to the user's manipulation. A display form of the basic icon, the menu icons, and the function icons will be described in detail below with reference to the drawings.

The storage unit 150 stores various information. The information stored by the storage unit 150, for example, is data of various types of applications to be executed by the information processing device 100, a setting value for the information processing device 100, document data, image data, and music data for use in the information processing device 100, etc. The information stored in the storage unit 150 can be read by the control unit 130 and displayed on the display unit 140, if necessary. In addition, in the storage unit 150, information can be stored according to control of the control unit 130.

An example in which data of an application for displaying the basic icon, the menu icons, and the function icons is stored in the storage unit 150 has been described in this embodiment, but the present disclosure is not limited to the related example. For example, the communication unit 160 to be described below may acquire the data of the application for displaying the basic icon, the menu icons, and the function icons from another device on the network every time the user performs an activation manipulation on the application.

The communication unit 160 is an interface configured to perform communication with the other device. The control unit 130 can control the communication of the communication unit 160 with the other device. For example, the communication unit 160 can transmit the information stored in the storage unit 150 according to control of the control unit 130.

The functional configuration example of the information processing device 100 according to the embodiment of the present disclosure has been described above using FIG. 1. Next, an operation example of the information processing device 100 according to an embodiment of the present disclosure will be described.

[Operation Example of Information Processing Device]

Figure 2:
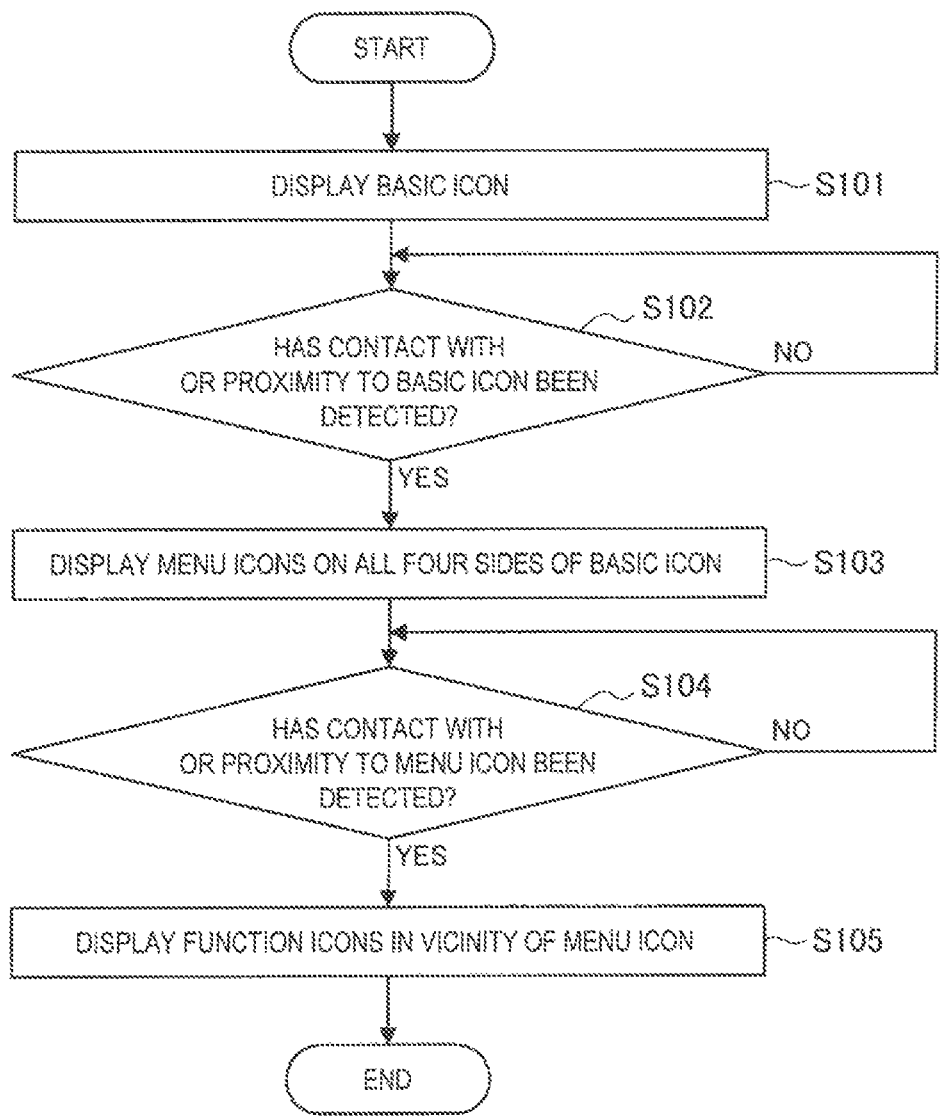
FIG. 2 is a flowchart illustrating an operation example of the information processing device 100 according to an embodiment of the present disclosure.

FIG. 2 is a flowchart illustrating an operation example of the information processing device 100 according to an embodiment of the present disclosure. In FIG. 2, the operation example in which the information processing device 100 displays the basic icon, the menu icons, and the function icons on the display unit 140 is illustrated. Hereinafter, the operation example of the information processing device 100 according to the embodiment of the present disclosure will be described using FIG. 2.

When the user of the information processing device 100 performs the manipulation of activating an application for displaying the above-described basic icon, menu icons, and function icons on the information processing device 100, the information processing device 100 executes a process of activating the application in the control unit 130 according to the manipulation. As described above, data of the application can be stored in the storage unit 150. Then, when the control unit 130 activates the application in this embodiment, the information processing device 100 executes a process of causing the display unit 140 to display only the basic icon among the basic icon, the menu icons, and the function icons (step S101). The control unit 130 can execute control of the above-described display.

Figure 3:
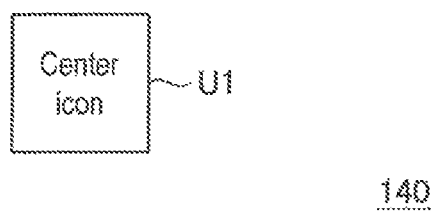
FIG. 3 is an explanatory diagram illustrating an example of information displayed on a display unit 140.

In the above-described step S101, an example of a state in which only the basic icon among the basic icon, the menu icons, and the function icons is displayed on the display unit 140 is shown. FIG. 3 is an explanatory diagram illustrating an example of information displayed on the display unit 140. In FIG. 3, a state in which only a basic icon U1 is displayed on the display unit 140 according to display control of the control unit 130 through the activation of the application is illustrated. Also, hereinafter, this application, for example, will be described as a memo application for allowing the user to write text with a finger, a stylus pen, or the like, but, of course, it is needless to say that the present disclosure is not limited to the memo application.

Also, it is needless to say that an initial display position of the basic icon U1 is not limited to a specific position. For example, the basic icon U1 may be displayed in the center of the display unit 140 and the application may be displayed at a position of the application at a point in time at which the application was previously ended. In addition, the control unit 130 can execute display control for moving a display position of the basic icon U1 according to the user's manipulation on the manipulation unit 110. For example, when the user executes a so-called long pressing manipulation on a position at which the basic icon U1 is displayed, the control unit 130 may set a state in which display control for moving the display position of the basic icon U1 is possible according to movement of the user's finger, the stylus pen, or the like.

In the state in which only the basic icon is displayed on the display unit 140 among the basic icon, the menu icons, and the function icons in the above-described step S101, the information processing device 100 waits until contact with or proximity to the basic icon performed with the user's finger, the stylus pen, or the like is detected (step S102). The manipulation detection unit 120 can perform the detection.

When the contact with or the proximity to the basic icon performed with the user's finger, the stylus pen, or the like is detected in the above-described step S102, the information processing device 100 subsequently causes the display unit 140 to display menu icons on all four sides of the basic icon (step S103). The control of the above-described display can be executed by the control unit 130.

Figure 4:
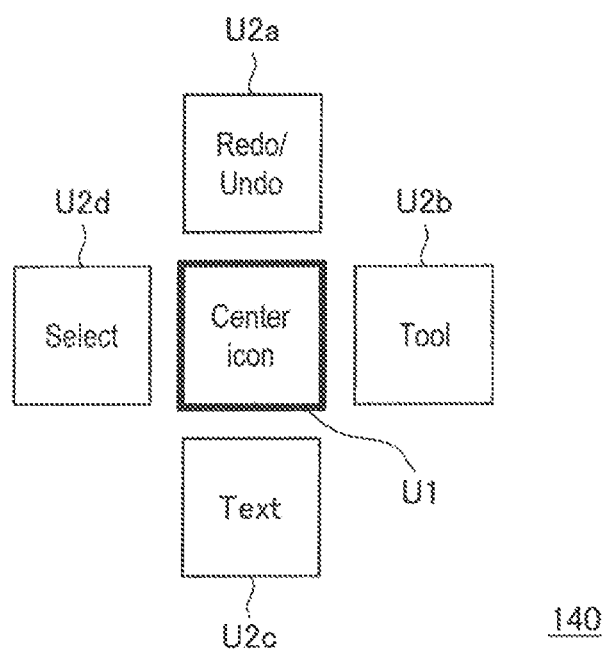
FIG. 4 is an explanatory diagram illustrating an example of information displayed on a display unit 140.

In the above-described step S103, an example of a state in which the display unit 140 displays the menu icons on all four sides of the basic icon is shown. FIG. 4 is an explanatory diagram illustrating an example of information displayed on the display unit 140. In FIG. 4, a state in which menu icons U2a, U2b, U2c, and U2d are displayed one by one on all four sides of the basic icon U1 on the display unit 140 according to display control of the control unit 130 through the contact with or proximity to the basic icon U1 performed with the user's finger, the stylus pen, or the like is illustrated. Also, intervals between the basic icon U1 and the menu icons U2a, U2b, U2c, and U2d are not limited to the example illustrated in FIG. 4, but may be narrower than those illustrated in FIG. 4.

Hereinafter, an example in which the menu icon U2a is displayed above the basic icon U1, the menu icon U2b is displayed on the right of the basic icon U1, the menu icon U2c is displayed below the basic icon U1, and the menu icon U2d is displayed on the left of the basic icon U1 will be described.

In addition, in FIG. 4, for convenience of description, the basic icon U1 is illustrated with a thick edge to indicate that contact with or proximity to the basic icon U1 is performed with the user's finger, the stylus pen, or the like. Also, although the icon in contact with or in proximity to the user's finger, the stylus pen, or the like is illustrated with a thick edge in the following description, the icon may be displayed without a thick edge on the actual screen.

As illustrated in FIG. 4, the information processing device 100 causes the display unit 140 to display the menu icons U2a, U2b, U2c, and U2d on all four sides of the basic icon U1 when the contact with or proximity to the basic icon U1 performed with the user's finger, the stylus pen, or the like is detected. The user of the information processing device 100 can select the menu icons U2a, U2b, U2c, and U2d by bringing the finger, the stylus pen, or the like in contact with or in proximity to any of the menu icons U2a, U2b, U2c, and U2d in a state in which the finger, the stylus pen, or the like is in contact with or in proximity to the display unit 140.

Figure 5:
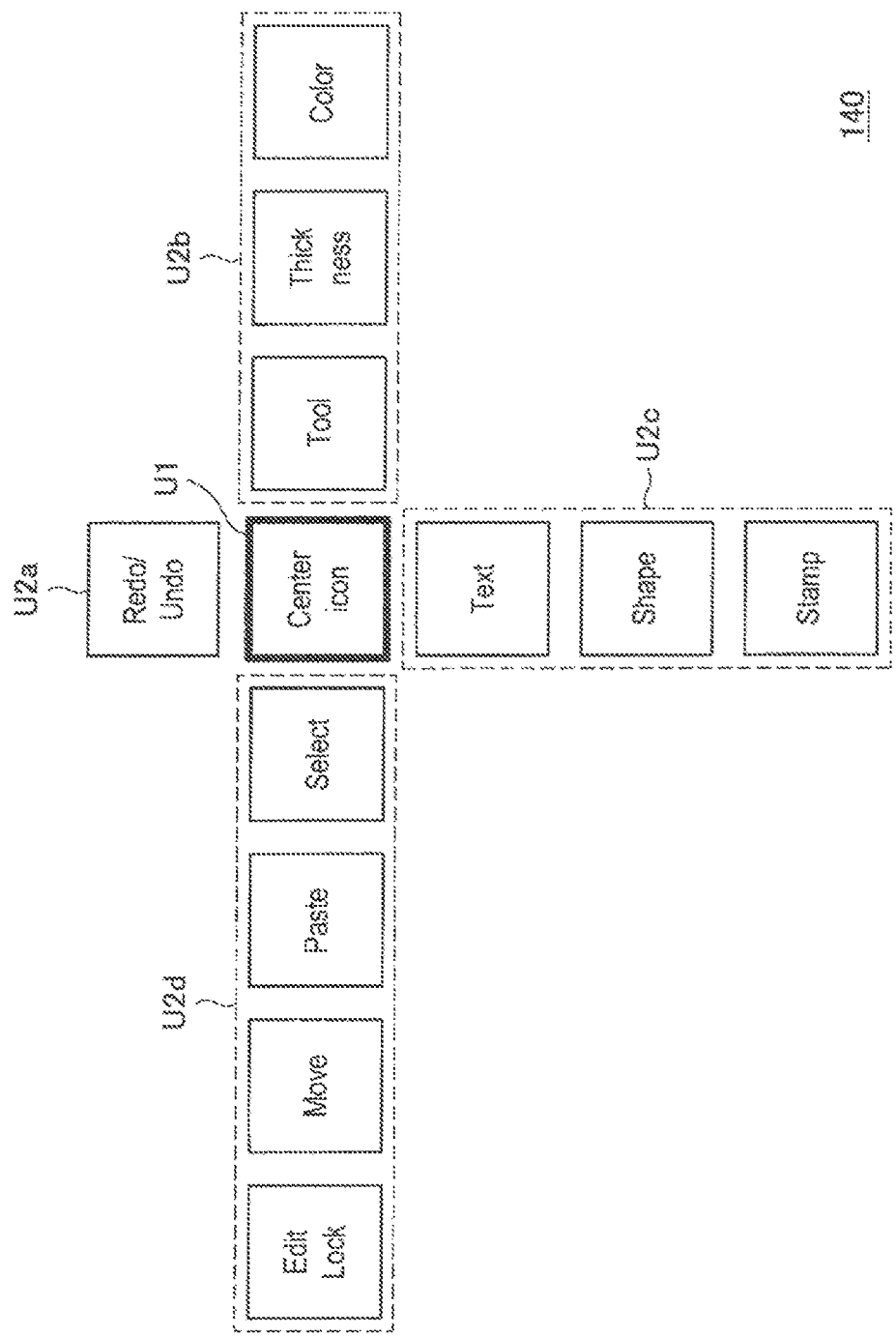
FIG. 5 is an explanatory diagram illustrating an example of information displayed on a display unit 140.

Also, when there are a plurality of icons for each of the menu icons U2a, U2b, U2c, and U2d to be displayed on all four sides of the basic icon U1, the information processing device 100 may display all icons without displaying one icon in each direction as illustrated in FIG. 4. FIG. 5 is an explanatory diagram illustrating an example of information displayed on the display unit 140. In FIG. 5, the state in which one or more menu icons U2a, U2b, U2c, and U2d are displayed on the display unit 140 according to the display control of the control unit 130 through the contact with or proximity to the basic icon U1 performed with the user's finger, the stylus pen, or the like is illustrated. In the example illustrated in FIG. 5, one menu icon U2a is displayed above the basic icon U1, three menu icons U2b are displayed on the right of the basic icon U1, three menu icons U2c are displayed below the basic icon U1, and four menu icons U2d are displayed on the left of the basic icon U1, on the display unit 140.

Menu icons to be displayed in the same direction may provide the same or similar functions. For example, in the example illustrated in FIG. 5, the menu icons U2b are icons for providing functions related to settings of a pen for allowing the user to input handwriting and all the menu icons U2d are icons for providing edit functions.

In the state in which the menu icons are displayed on all four sides of the basic icon on the display unit 140 in the above-described step S103, the information processing device 100 waits until contact with or proximity to any menu icon performed with the user's finger, the stylus pen, or the like is detected (step S104). The manipulation detection unit 120 can perform the detection.

When the contact with or the proximity to the menu icon performed with the user's finger, the stylus pen, or the like is detected in the above-described step S104, the information processing device 100 subsequently causes the display unit 140 to display function icons for executing functions belonging to a function corresponding to the menu icon in the vicinity of the menu icon selected through the contact or proximity (step S105). The control of the above-described display can be executed by the control unit 130.

Figure 6:
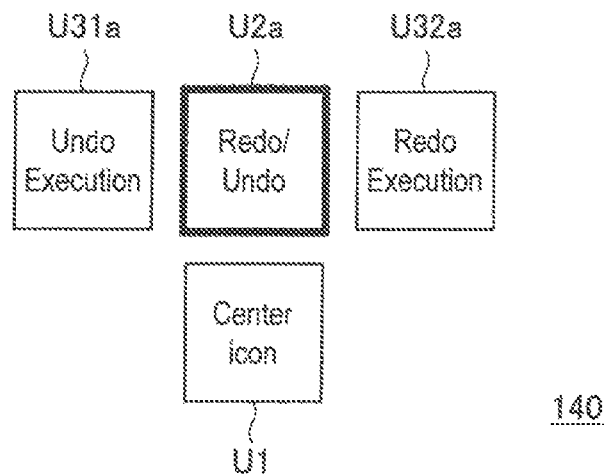
FIG. 6 is an explanatory diagram illustrating an example of information displayed on a display unit 140.

In the above-described step S105, an example of a state in which the display unit 140 displays the function icon in the vicinity of the menu icon is shown. FIG. 6 is an explanatory diagram illustrating an example of information displayed on the display unit 140. In FIG. 6, a state in which function icons U31a and U32a are displayed one by one on the left and right of the menu icon U2a on the display unit 140 according to display control of the control unit 130 through the contact with or proximity to the menu icon U2a performed with the user's finger, the stylus pen, or the like is illustrated. Also, intervals between the menu icon U2a and the function icons U31a and U32a are not limited to the example illustrated in FIG. 6, but may be narrower than those illustrated in FIG. 6.

Also, through the contact with or proximity to the menu icon U2a performed with the user's finger, the stylus pen, or the like, the information processing device 100 can execute display control for deleting the other menu icons U2b, U2c, and U2d displayed on the display unit 140 from the display unit 140. The information processing device 100 can show the user which menu icon is in a selected state by deleting the other menu icons U2b, U2c, and U2d through the contact with or the proximity to the menu icon U2a performed with the user's finger, the stylus pen, or the like.

In FIG. 6, an example in which the user's finger, the stylus pen, or the like is in contact with or in proximity to the menu icon U2a for executing a Redo function or an Undo function is illustrated. The Redo function is a function of re-executing the same manipulation as that executed by the user and the Undo function is a function of canceling a manipulation immediately previously executed by the user. In FIG. 6, a state in which the function icon U31a for executing the Undo function and the function icon U32a for executing the Redo function are displayed on the display unit 140 through the contact with or proximity to the menu icon U2a performed with the user's finger, the stylus pen, or the like is illustrated.

The user of the information processing device 100 can select a function provided by the function icon U32a or U32b by separating the finger, the stylus pen, or the like from the display unit 140 (by separating the finger, the stylus pen, or the like from the display unit 140 after one contact with the display unit 140 in the case of a state in which the finger the stylus pen, or the like is in a proximity state) after moving the finger, the stylus pen, or the like to a position at which the function icon U32a or U32b is displayed while a state in which the finger, the stylus pen, or the like is in contact with or in proximity to the display unit 140 is maintained.

As described above, the information processing device 100 can efficiently open icons on the screen by displaying the function icons U31a and U32a in a direction (that is, a left/right direction) orthogonal to a direction (that is, an upward direction) in which the menu icon U2a is displayed when viewed from the basic icon U1.

A function to be executed by the function icon displayed on one side of the menu icon may be opposite to a function to be executed by the function icon displayed on the other side of the menu icon. For example, in the example illustrated in FIG. 6, the function to be executed by the function icon U31a displayed on the left side of the menu icon U2a is that for executing the Undo function and the function to be executed by the function icon U32a displayed on the right side of the menu icon U2a is that for executing a Redo function opposite to the Undo function.

When the function to be executed by the function icon displayed on one side of the menu icon is opposite to the function to be executed by the function icon displayed on the other side as described above, the information processing device 100 can specify that functions to be executed by function icons displayed at relative positions are opposite to each other. The information processing device 100 can reduce selection errors of the user by specifying that the functions to be executed by function icons displayed at the relative positions are opposite to each other.

When the user brings the finger or the stylus pen in contact with a position at which the basic icon U1 illustrated in FIG. 3 or the like is displayed and moves the finger or the stylus pen on the display unit 140 while maintaining the contact, the control unit 130 can track the movement to execute display control for changing the position of the basic icon U1.

Also, a movable range of the basic icon UL may be the entire range of the display unit 140. For example, when the basic icon U1 and the menu icons U2a, U2b, U2c, and U2d are displayed as illustrated in FIG. 5, the control unit 130 may designate a range in which the menu icons U2a, U2b. U2c, and U2d are within the display range of the display unit 140 as the movable range of the basic icon U1.

When the user of the information processing device 100 is familiar with the manipulation of the application, he/she knows which menu icon or function icon is displayed at which position and rapidly manipulates the finger, the stylus pen, or the like to rapidly execute a function. In consideration of this case, the information processing device 100 can execute the function provided by the function icon when the user brings the finger, the stylus pen, or the like in contact with a position at which the function icon is displayed and the user separates the finger, the stylus pen, or the like from the position even when the display of the icon is not timed with the user's manipulation.

Figure 7:
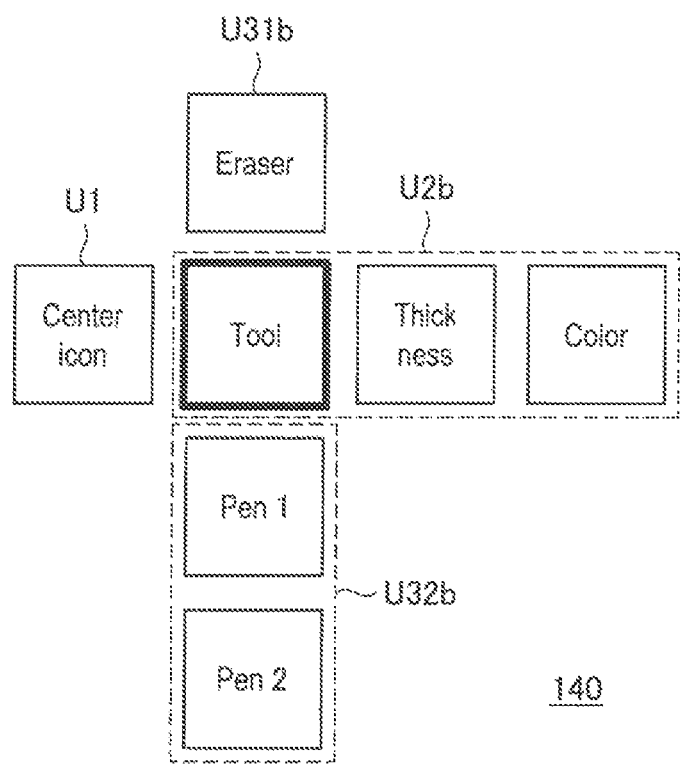
FIG. 7 is an explanatory diagram illustrating an example of information displayed on a display unit 140.

Another display example of the function icon is shown. FIG. 7 is an explanatory diagram illustrating an example of information displayed on the display unit 140. In FIG. 7, a state in which one or more function icons U31b and U32b are displayed above/below the menu icon U2b on the display unit 140 according to the display control of the control unit 130 through the user's finger, the stylus pen, or the like being in contact with or in proximity to the menu icon U2b is illustrated. In FIG. 7, a state in which the information processing device 100 executes display control for deleting the other menu icons U2a, U2c, and U2d displayed on the display unit 140 from the display unit 140 through the contact with or proximity to the menu icon U2b performed with the user's finger, the stylus pen, or the like is also illustrated.

In FIG. 7, an example in which the user's finger, the stylus pen, or the like is in contact with or in proximity to a menu icon labeled "Tool" to execute a function of writing or deleting text or the like among the menu icons U2b is illustrated. In FIG. 7, a state in which a function icon U32a for executing a function of deleting written text or the like is displayed on the display unit 140 through the contact with or proximity to the menu icon labeled "Tool" performed with the user's finger, the stylus pen, or the like is illustrated. In addition, in FIG. 7, a state in which function icons U32b for setting a type of pen when the user writes text or the like are displayed on the display unit 140 is illustrated.

As described above, the information processing device 100 can efficiently open icons on the screen by displaying the function icons U31b and U32b in a direction (that is, an upward/downward direction) orthogonal to a direction (that is, a right direction) in which the menu icon U2b is displayed when viewed from the basic icon U1.

In addition, even in the example illustrated in FIG. 7, the function icons U31b and U32b are displayed so that a function to be executed by the function icon U31b displayed above the menu icon U2b is opposite to functions to be executed by the function icons U32b displayed below the menu icon U2b. That is, in the example illustrated in FIG. 7, the function icon U32a for executing the function of deleting the written text or the like is displayed above the menu icon U2b and the function icons U32b for executing the function of setting the type of pen when the user writes the text or the like are displayed below the menu icon U2b.

As illustrated in FIG. 7, a display example in which the user brings the finger, the stylus pen, or the like in contact with or in proximity to another menu icon U2b while the user brings the finger, the stylus pen, or the like in contact with or in proximity to the display unit 140 in a state in which the basic icon U1, the menu icon U2b, and the function icons U31b and U32b are displayed on the display unit 140 is illustrated.

Figure 8:
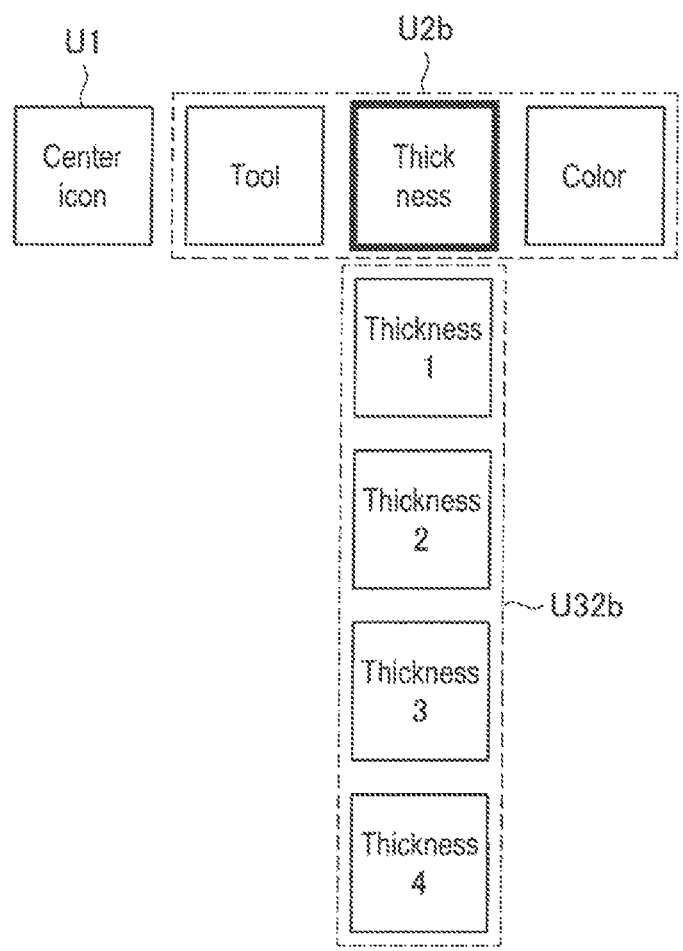
FIG. 8 is an explanatory diagram illustrating an example of information displayed on a display unit 140.

FIG. 8 is an explanatory diagram illustrating an example of information displayed on the display unit 140. In FIG. 8, a display example in which the user brings the finger, the stylus pen, or the like in contact with or in proximity to the menu icon U2b labeled "Thickness" on the right of the menu icon U2b labeled "Tool" in FIG. 7 is illustrated. The menu icon U2b labeled "Thickness" is a menu icon for executing a function of setting a thickness of a pen when the user writes text or the like. As illustrated in FIG. 8, function icons U32b for setting the thickness of the pen are displayed on the display unit 140 when the user brings the finger, the stylus pen, or the like in contact with or in proximity to the menu icon U2b labeled "Thickness."

In the example illustrated in FIG. 8, the function icons U32b for setting the thickness of the pen are displayed below the menu icon U2b labeled "Thickness." This is because there is no function opposite to the function of setting the thickness of the pen. Of course, by designating a certain predetermined thickness as a reference thickness, the display unit 140 may display a function icon for setting the thickness of the pen so that the thickness of the pen is thinner than the reference thickness above the menu icon U2b and display a function icon for setting the thickness of the pen so that the thickness of the pen is thicker than the reference thickness below the menu icon U2b.

As illustrated in FIG. 8, a display example in which the user brings the finger, the stylus pen, or the like in contact with or in proximity to another menu icon U2b while the user brings the finger, the stylus pen, or the like in contact with or in proximity to the display unit 140 in a state in which the basic icon U1, the menu icon U2b, and the function icon U32b are displayed on the display unit 140 is illustrated.

Figure 9:
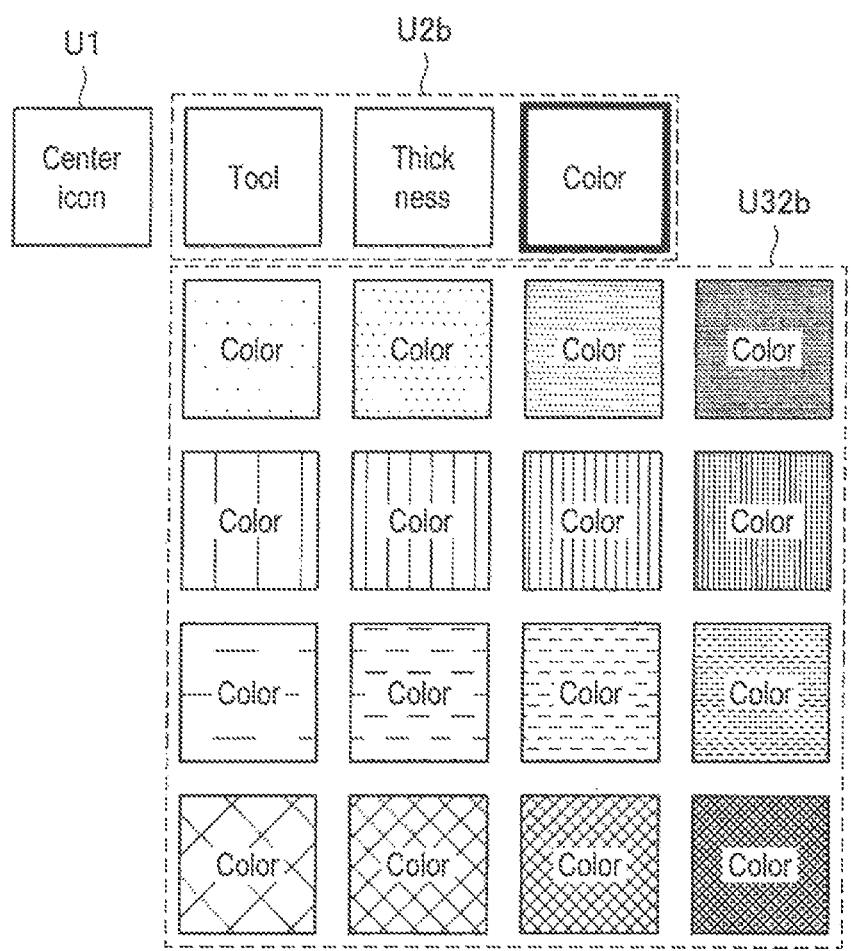
FIG. 9 is an explanatory diagram illustrating an example of information displayed on a display unit 140.

FIG. 9 is an explanatory diagram illustrating an example of information displayed on the display unit 140. In FIG. 9, a display example in which the user brings the finger, the stylus pen, or the like in contact with or in proximity to the menu icon U2b labeled "Color" on the right of the menu icon U2b labeled "Thickness" in FIG. 8 is illustrated. The menu icon U2b labeled "Color" is a menu icon for executing a function of setting a color of a pen when the user writes text or the like. As illustrated in FIG. 9, function icons U32b for setting the color of the pen are displayed on the display unit 140 when the user brings the finger, the stylus pen, or the like in contact with or in proximity to the menu icon U2b labeled "Color."

In FIG. 9, a state in which function icons U32b for setting the color of the pen are displayed on the display unit 140 in four columns in the vertical direction and four rows in the horizontal direction is illustrated. In this manner, the function icons may be displayed on the display unit 140 in a plurality of columns instead of one column.

Also, there may be a plurality of menu icons for executing the same or similar functions. Hereinafter, an example in which there are a plurality of menu icons for executing the same or similar functions is illustrated.

Figure 10:
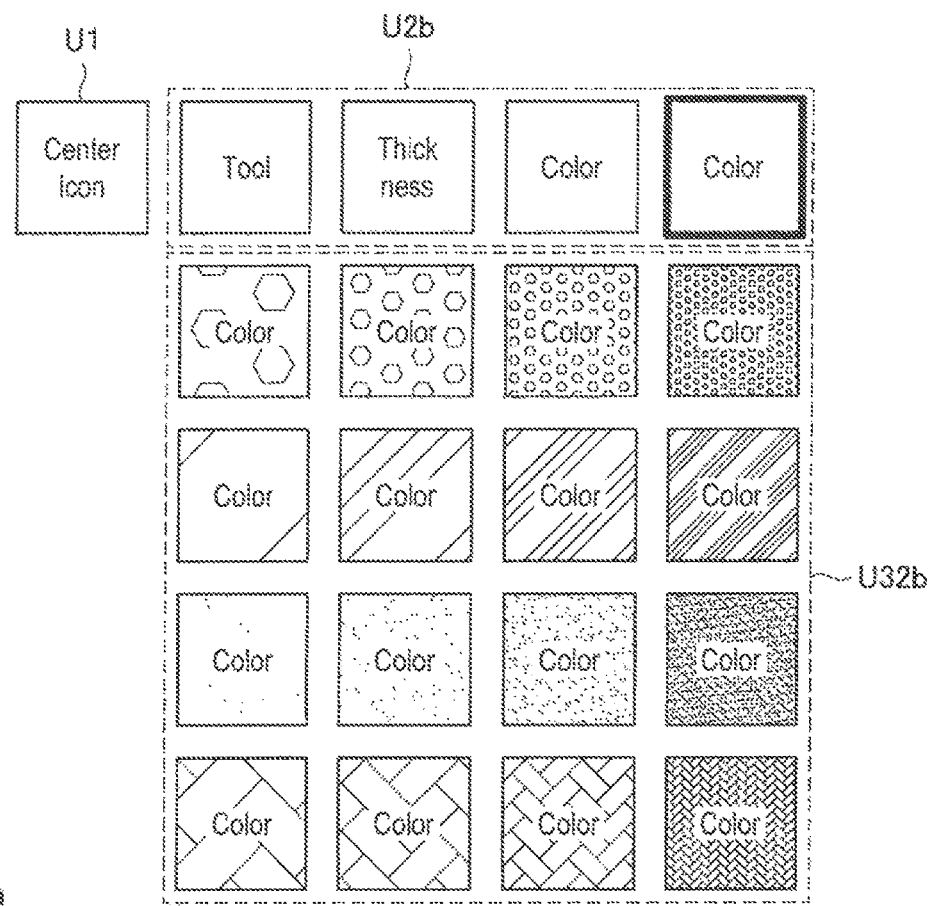
FIG. 10 is an explanatory diagram illustrating an example of information displayed on a display unit 140.

FIG. 10 is an explanatory diagram illustrating an example of information displayed on the display unit 140. In FIG. 10, an example of information displayed on the display unit 140 when there are two menu icons labeled "Color" for executing a function of setting the color of the pen is illustrated. In a state in which the user brings the finger, the stylus pen, or the like in contact with or in proximity to a third menu icon U2b labeled "Color" in the right direction from the basic icon U1, function icons U32b for setting the color of the pen are displayed on the display unit 140 in four columns in the vertical direction and four rows in the horizontal direction as illustrated in FIG. 10 when the user brings the finger, the stylus pen, or the like in contact with or in proximity to a menu icon U2b labeled "Color" on the right of the third menu icon U2b.

Comparing FIG. 9 with FIG. 10, it can be seen that the display position of the function icons U32b does not change when the user brings the finger, the stylus pen, or the like in contact with or in proximity to either of the two menu icons U2b labeled "Color" when the function icons U32b for setting the color of the pen are arranged across a plurality of columns.

As described above, the display position of the function icons belonging to the relevant menu icon does not change when the user brings the finger, the stylus pen, or the like in contact with or in proximity to a plurality of menu icons for executing the same or similar functions. Therefore, the information processing device 100 can show the user which menu icon is in a selected state in a way that is easy to understand.

Figure 11:
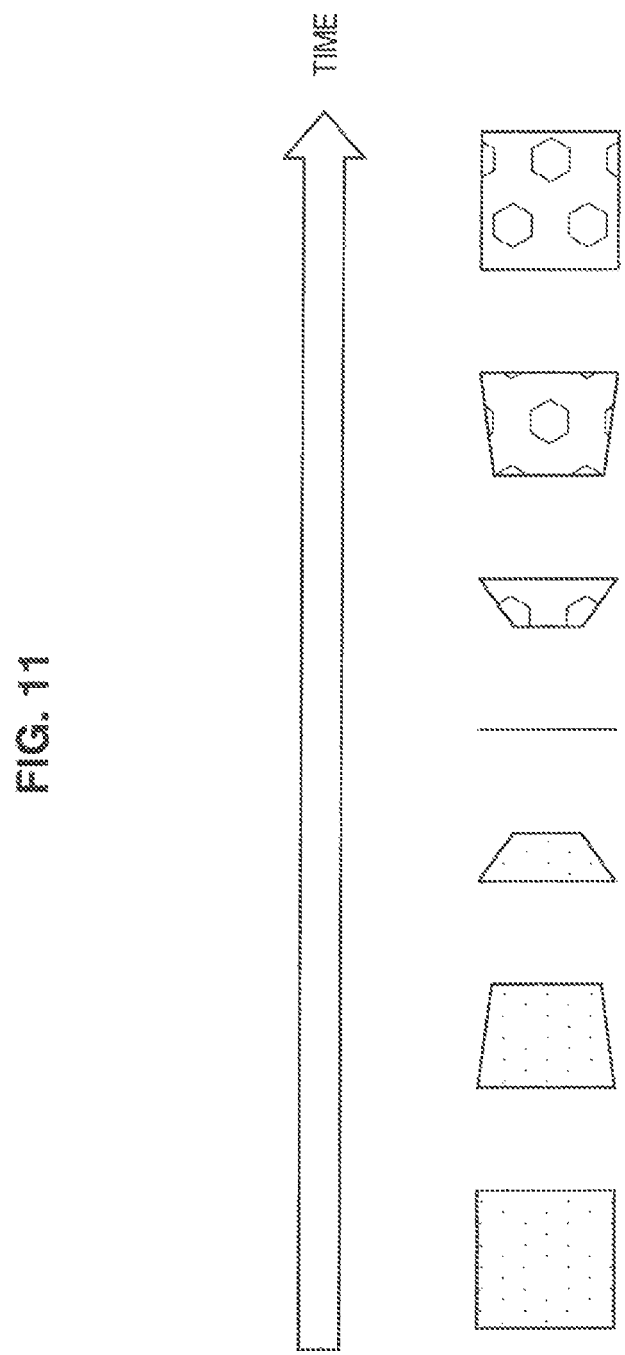
FIG. 11 is an explanatory diagram illustrating an example of information displayed on a display unit 140.

When there are a plurality of menu icons for executing the same or similar functions and the display position of the function icons does not change, the function icon may be rotated at its position if the menu icon brought in contact with or in proximity to the finger, the stylus pen, or the like by the user changes. FIG. 11 is an explanatory diagram illustrating an example of information displayed on the display unit 140. In FIG. 11, an example of a state in which the control unit 130 performs display control so that the function icon is rotated at its position if the menu icon brought in contact with or in proximity to the finger, the stylus pen, or the like by the user changes is illustrated.

As illustrated in FIG. 11, the control unit 130 performs display control so that the function icon is rotated at its position. Therefore, the information processing device 100 can show the user which menu icon is in a selected state and whether a menu icon in the selected state has changed in a way that is easy to understand.

Also, an example in which the control unit 130 performs display control so that a flat-shaped function icon is rotated at its position is illustrated in FIG. 11, but the present disclosure is not limited to this example. For example, the case of three or four menu icons for executing the same or similar functions is considered. In this case, the control unit 130 performs display control so that a function icon of a triangular pole shape or a cubic shape is rotated at its position. Therefore, likewise, the information processing device 100 can show the user which menu icon is in a selected state and whether a menu icon in the selected state has changed in a way that is easy to understand even in the case of three or four menu icons for executing the same or similar functions.

The control unit 130 can lock the display of the above-described basic icon, menu icons, and function icons, that is, perform control so that no manipulation is received. For example, when the user executes the manipulation for locking the display of the basic icon, the menu icons, and the function icons at a predetermined position on the screen (for example, a so-called long pressing manipulation at a position at which no icon is displayed, a manipulation of an icon for locking, or the like), the control unit 130 can lock the display of icons, that is, execute display control so that display does not change even when the manipulation for the basic icon, the menu icons, and the function icons is performed.

A state in which the function icon U31a for executing the Undo function and the function icon U32a for executing the Redo function are displayed on the display unit 140 is illustrated in FIG. 6, but the information processing device 100 may cause the display unit 140 to display a dial for allowing the user to designate the number of times the Undo function or the Redo function is executed in addition to the function icons U31a and U32a.

Figure 12:
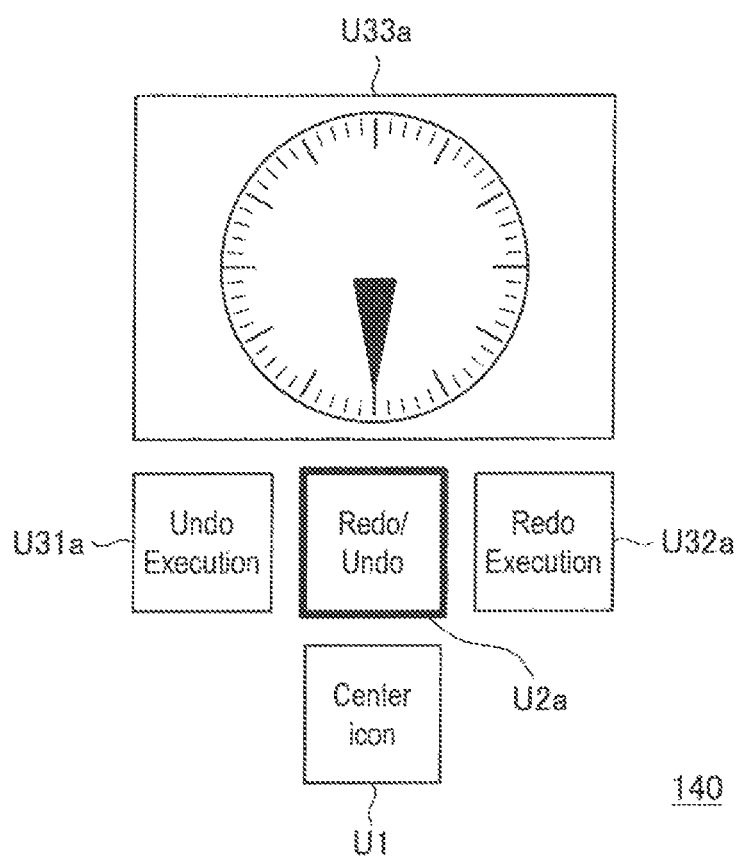
FIG. 12 is an explanatory diagram illustrating an example of information displayed on a display unit 140.

FIG. 12 is an explanatory diagram illustrating an example of information displayed on the display unit 140. In FIG. 12, an example of a state in which the display unit 140 displays a dial U33a for allowing the user to designate the number of times the Undo function or the Redo function is executed in addition to the function icons U31a and U32a is illustrated. The dial U33a is displayed on the display unit 140 in a state in which the user brings the finger, the stylus pen, or the like in contact with or in proximity to the position at which the menu icon U2a is displayed.

When the user moves the finger, the stylus pen, or the like to the position at which the dial U33a is displayed in a state in which the function icons U31a and U32a and the dial U33a are displayed as illustrated in FIG. 12, the user is in a state in which he or she can manipulate the dial U33a. Then, when the finger, the stylus pen, or the like is in contact with or in proximity to a position at which a needle of the dial U33a is displayed, the user can rotate the needle clockwise or counterclockwise.

When the needle of the dial U33a is rotated clockwise in the example illustrated in FIG. 12, the user can cause the information processing device 100 to execute the Undo function once per scale. In addition, when the needle of the dial U33a is rotated counterclockwise, the user can cause the information processing device 100 to execute the Redo function once per scale.

Even when the user separates the finger, the stylus pen, or the like from the dial U33a, the information processing device 100 may cause the display unit 140 to continuously display the function icons U31a and U32a and the dial U33a. By causing the display unit 140 to continuously display the function icons U31a and U32a and the dial U33a, the information processing device 100 can allow the user to reselect the function icons U31a and U32a and the dial U33a. Also, the function icons U31a and U32a and the dial U33a can be deleted according to control of the control unit 130 when the user brings the finger, the stylus pen, or the like in contact with or in proximity to the position of the basic icon U1 or a position at which no icon is displayed.

Figure 13:
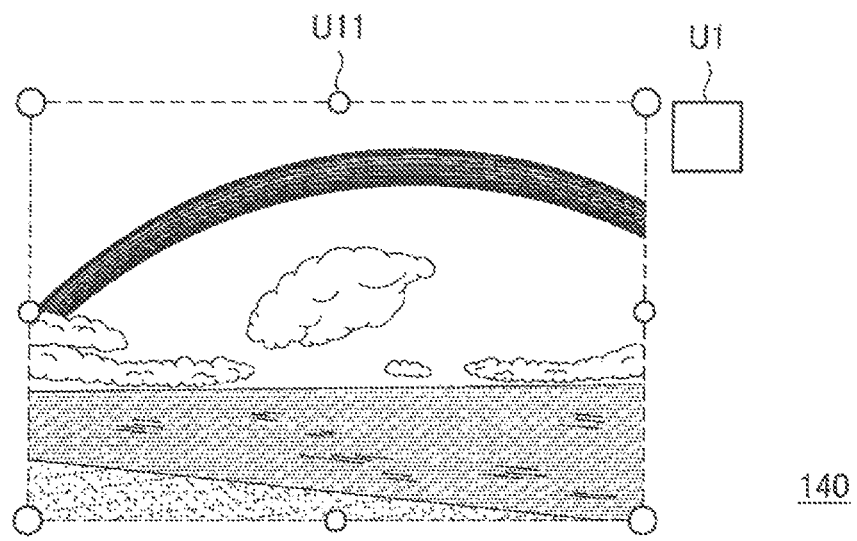
FIG. 13 is an explanatory diagram illustrating an example of information displayed on a display unit 140.

Another display example of a basic icon, menu icons, and function icons will be described. FIG. 13 is an explanatory diagram illustrating an example of information displayed on the display unit 140. In FIG. 13, a state in which a basic icon U1 is displayed in the vicinity of a partial region U11 when the user selects the partial region U1 of information displayed on the display unit 140 is illustrated.

As in the above-described examples, the information processing device 100 causes the display unit 140 to display menu icons in the vicinity of the basic icon when the user brings the finger, the stylus pen, or the like in contact with or in proximity to the position at which the basic icon U1 is displayed.

Figure 14:
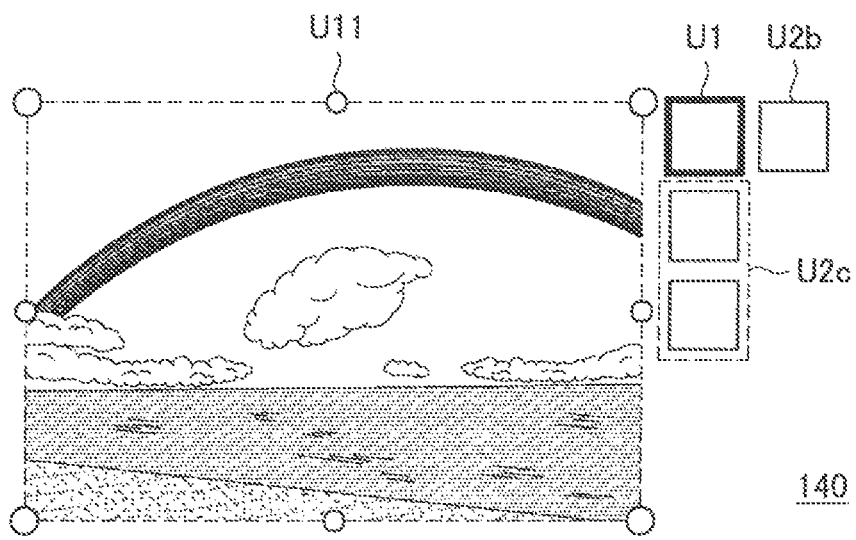
FIG. 14 is an explanatory diagram illustrating an example of information displayed on a display unit 140.

FIG. 14 is an explanatory diagram illustrating an example of information displayed on the display unit 140. In FIG. 14, the example of the information displayed on the display unit 140 when the user brings the finger, the stylus pen, or the like in contact with or in proximity to the position at which the basic icon U1 is displayed in the state illustrated in FIG. 13 is illustrated. In FIG. 14, an example in which the control unit 130 executes control for displaying a menu icon U2b on the right of the basic icon U1 and menu icons U2c below the basic icon U1 when the user brings the finger, the stylus pen, or the like in contact with or in proximity to the position at which the basic icon U1 is displayed is illustrated.

For example, the menu icon U2b displayed on the right of the basic icon U1 is assumed to be a menu icon for allowing the user to execute a function of manipulating a layer of the region U11 selected by the user. When the user brings the finger, the stylus pen, or the like in contact with or in proximity to the position at which the menu icon U2b is displayed, the control unit 130 causes the display unit 140 to display a function icon for executing the function of manipulating the layer of the region selected by the user.

Figure 15:
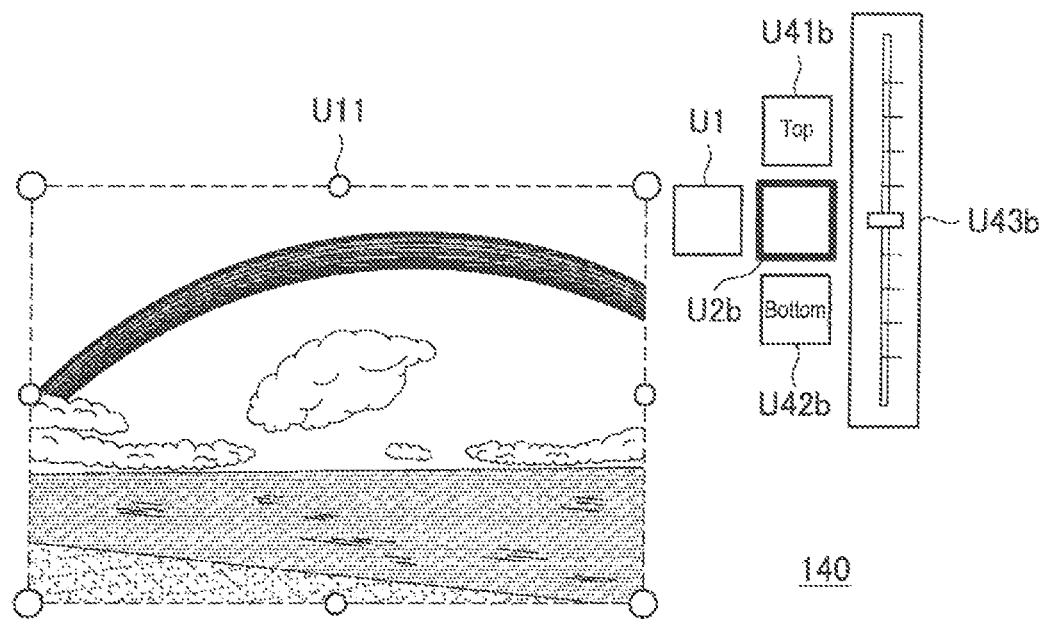
FIG. 15 is an explanatory diagram illustrating an example of information displayed on a display unit 140.

FIG. 15 is an explanatory diagram illustrating an example of information displayed on the display unit 140. In FIG. 15, the example of the information displayed on the display unit 140 when the user brings the finger, the stylus pen, or the like in contact with or in proximity to the position at which the menu icon U2b is displayed in the state illustrated in FIG. 14 is illustrated. In FIG. 15, an example in which the control unit 130 executes control for displaying a function icon U41b above the menu icon U2b and a function icon U42b below the menu icon U2b when the user brings the finger, the stylus pen, or the like in contact with or in proximity to the position at which the menu icon U2b is displayed is illustrated.

A function icon U41b is an icon for allowing the user to execute a function of raising the layer of the region U11 selected by the user to the top. In addition, a function icon U42b is an icon for allowing the user to execute a function of lowering the layer of the region U11 selected by the user to the bottom.

The user brings the finger, the stylus pen, or the like in contact with or in proximity to the position at which the function icon U41b is displayed and separates the finger, the stylus pen, or the like from the display unit 140 (separates the finger, the stylus pen, or the like after one contact with the display unit 140 in the case in which the finger, the stylus pen, or the like is in a proximity state) to select a function provided by the function icon U41b. The same is also true for the function icon U42b.

In addition, in FIG. 15, a state in which a slide bar U43b is also displayed on the display unit 140 is illustrated. The slide bar U43b is for raising and lowering the layer of the region U11 selected by the user one layer at a time. The information processing device 100 can allow the user to perform minute adjustment of the layer for the region U11 selected by the user by displaying the slide bar U43b on the display unit 140 as described above.

Even when the user separates the finger, the stylus pen, or the like from the slide bar U43b, the information processing device 100 may cause the display unit 140 to continuously display the function icons U41b and U42b and the slide bar U43b. By causing the display unit 140 to continuously display the function icons U41b and U42b and the slide bar U43b, the information processing device 100 can allow the user to reselect the function icons U41b and U42b and the slide bar U43b. Also, the function icons U41b and U42b and the slide bar U43b can be deleted according to control of the control unit 130 when the user brings the finger, the stylus pen, or the like in contact with or in proximity to the position of the basic icon U1 or a position at which no icon is displayed.

The example in which the application for displaying the above-described basic icon, menu icons, and function icons is the memo application for allowing the user to write text with the finger, the stylus pen, or the like has been described above. Next, an example of another application in which a basic icon, menu icons, and function icons are displayed is shown.

For example, the application in which the basic icon, the menu icons, and the function icons are displayed may be an application for manipulating a television (TV). Hereinafter, an example in which the icons are displayed on the display unit 140 when the basic icon, the menu icons, and the function icons are displayed in the application for manipulating the TV will be described.

Figure 16:
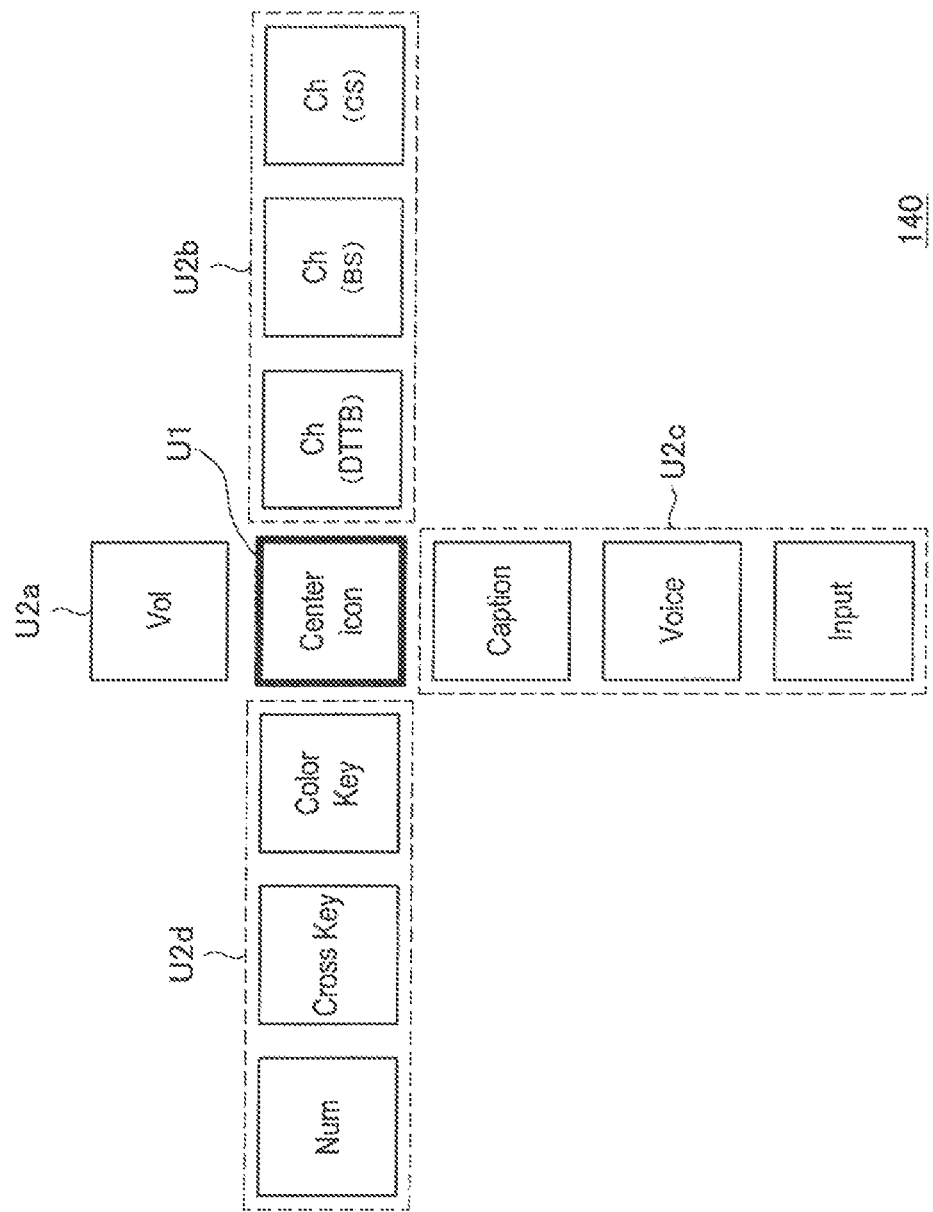
FIG. 16 is an explanatory diagram illustrating an example of information displayed on a display unit 140.

FIG. 16 is an explanatory diagram illustrating an example of information displayed on the display unit 140. In FIG. 16, the state in which one or more menu icons U2a, U2b, U2c, and U2d are displayed on the display unit 140 according to the display control of the control unit 130 through the contact with or proximity to the basic icon U1 performed with the user's finger, the stylus pen, or the like is illustrated. In the example illustrated in FIG. 16, one menu icon U2a is displayed above the basic icon U1, three menu icons U2b are displayed on the right of the basic icon U1, three menu icons U2c are displayed below the basic icon U1, and three menu icons U2d are displayed on the left of the basic icon U1, on the display unit 140.

In an example illustrated in FIG. 16, a menu icon U2a is an icon including a menu for allowing the user to adjust a volume of the TV. In addition, a menu icon U2b is an icon including a menu for allowing the user to execute a function of changing a channel of the TV. In addition, menu icons U2c are icons including menus for allowing the user to change settings of a caption, voice, and an external input of a video. Menu icons U2d are icons including menus for allowing the user to execute other functions of manipulating the TV.

Of course, it is needless to say that content of the icons displayed by the application for manipulating the TV or the number of icons is not limited to this example.

An example in which function icons are displayed in an application having menu icons illustrated in FIG. 16 will be described.

Figure 17:
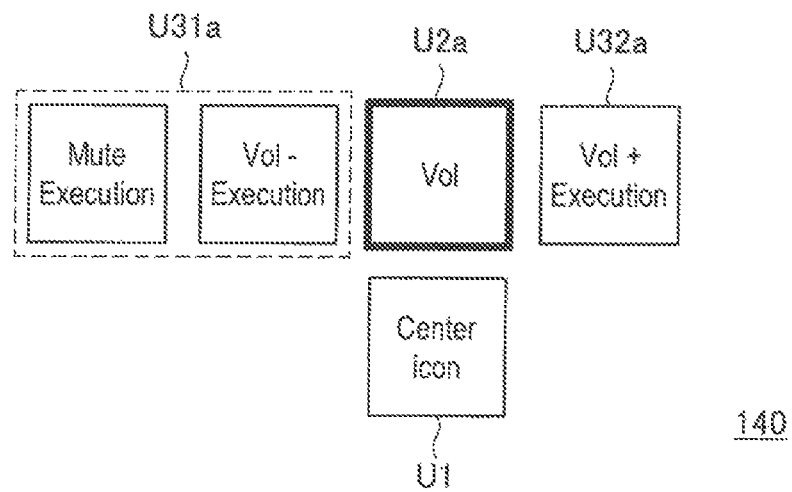
FIG. 17 is an explanatory diagram illustrating an example of information displayed on a display unit 140.

FIG. 17 is an explanatory diagram illustrating an example of information displayed on the display unit 140. In FIG. 17, an example in which the user's finger, the stylus pen, or the like is in contact with or in proximity with the menu icon U2a including a menu for allowing the user to execute a function of adjusting the volume of the TV is illustrated. In FIG. 17, a state in which a function icon U31a for executing a function of decreasing the volume or a mute function for turning off the sound and a function icon U32a for executing a function of increasing the volume are displayed on the display unit 140 through contact with or proximity to the menu icon U2a performed with the user's finger, the stylus pen, or the like is illustrated.

The function to be executed by the function icon U31a displayed on the left of the menu icon U2a illustrated in FIG. 17 and the function to be executed by the function icon U32a displayed on the right of the menu icon U2a are opposite to each other. That is, the function of decreasing the volume or the mute function of turning off the sound and the function of increasing the volume are opposite functions.

Figure 18:
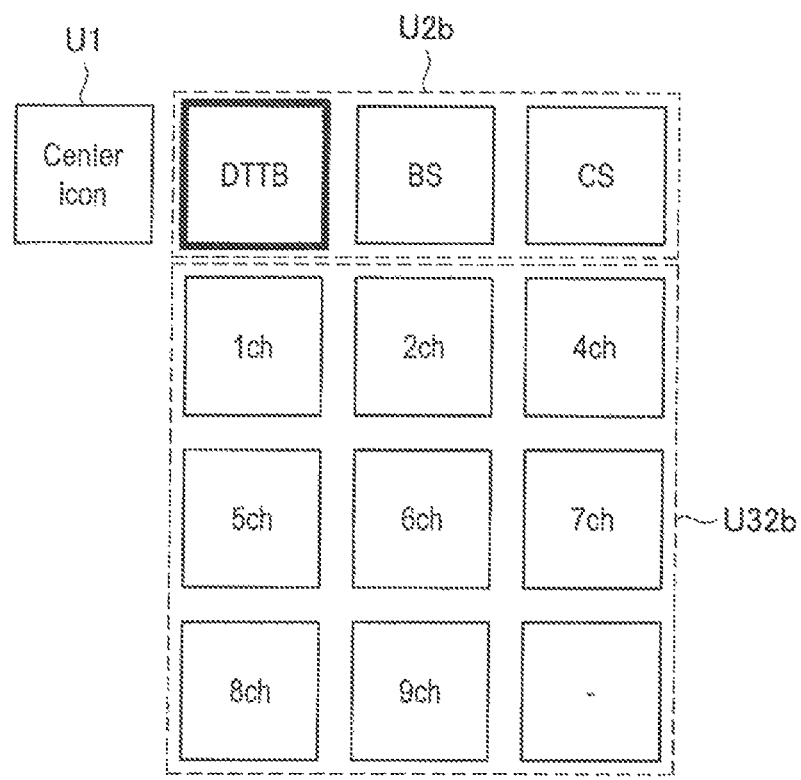
FIG. 18 is an explanatory diagram illustrating an example of information displayed on a display unit 140.

FIG. 18 is an explanatory diagram illustrating an example of information displayed on the display unit 140. In FIG. 18, an example in which the user's finger, the stylus pen, or the like is in contact with or in proximity to a menu icon U2b including a menu for allowing the user to execute a function of changing the channel of the TV is illustrated. In FIG. 18, a state in which function icons U32b for executing the function of changing the channel are displayed on the display unit 140 through contact with or proximity to a leftmost menu icon performed with the user's finger, the stylus pen, or the like among the menu icons U2b is illustrated.

As in the above-described function of setting the color of the pen, a menu icon for executing the same function of changing the channel is included in the menu icons U2b. Accordingly, when any menu icon included in the menu icons U2b is set by the user, the control unit 130 can cause the display unit 140 to perform display without changing a display position of the function icons U32b.

Figure 19:
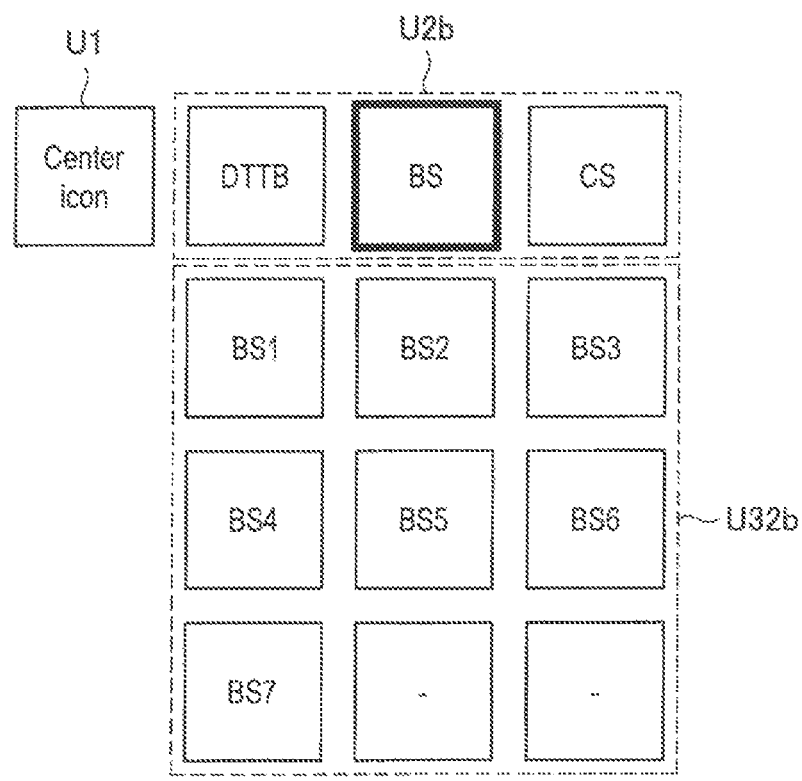
FIG. 19 is an explanatory diagram illustrating an example of information displayed on a display unit 140.

FIG. 19 is an explanatory diagram illustrating an example of information displayed on the display unit 140. In FIG. 19, an example in which the user's finger, the stylus pen, or the like is in contact with or in proximity to a menu icon U2b including a menu for allowing the user to execute a function of changing the channel of the TV is illustrated. In FIG. 19, a state in which function icons U32b for executing the function of changing the channel are displayed on the display unit 140 through contact with or proximity to a center menu icon performed with the user's finger, the stylus pen, or the like among the menu icons U2b is illustrated.

Comparing FIG. 19 with FIG. 18, it can be seen that the display position of the function icons 32b does not change even when the user brings the finger, the stylus pen, or the like in contact with or in proximity to either of a menu icon U2b labeled "DTTB" and a menu icon U2b labeled "BS" when the function icons U32b for changing the channel are arranged across a plurality of columns.

As described above, the display position of the function icons belonging to the relevant menu icon does not change when the user brings the finger, the stylus pen, or the like in contact with or in proximity to a plurality of menu icons for executing the same or similar functions. Therefore, the information processing device 100 can show the user which menu icon is in a selected state in a way that is easy to understand.

Figure 20:
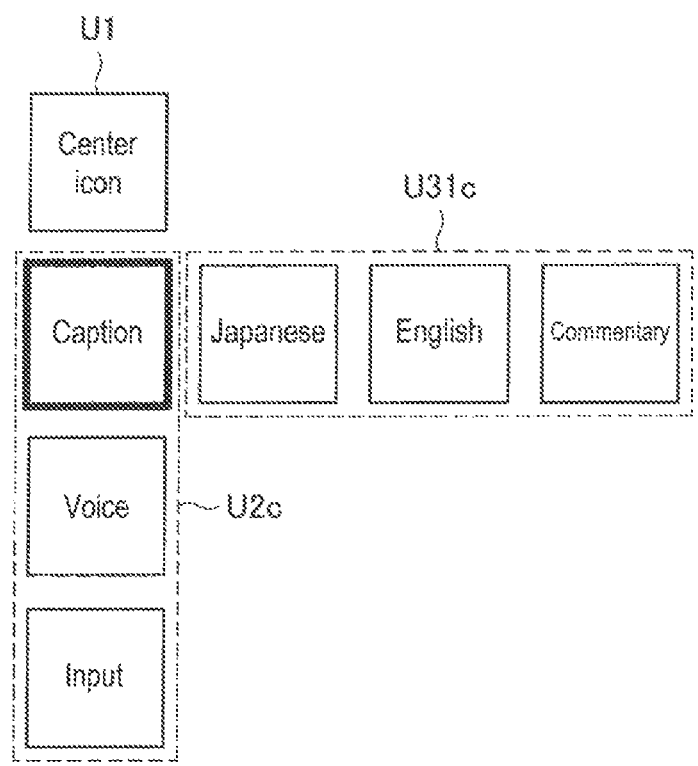
FIG. 20 is an explanatory diagram illustrating an example of information displayed on a display unit 140.
Figure 21:
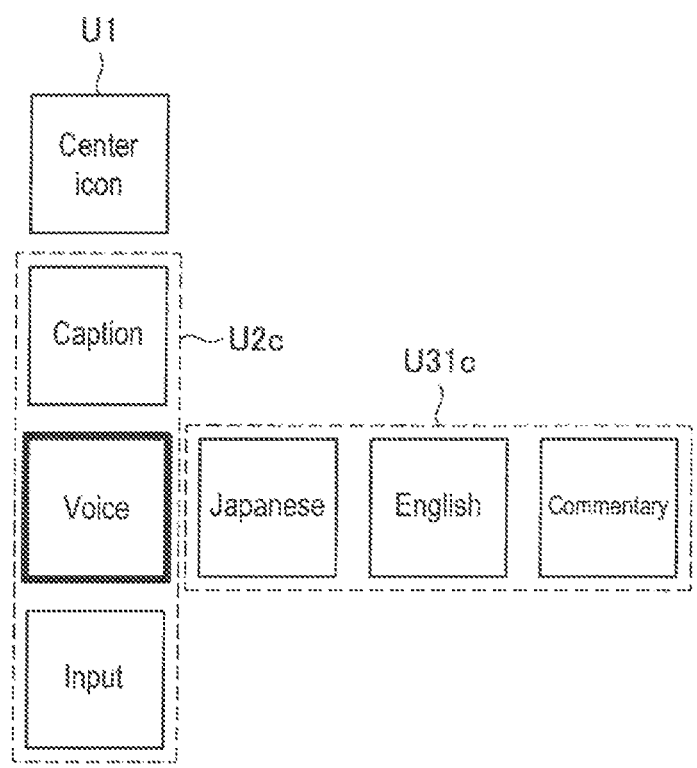
FIG. 21 is an explanatory diagram illustrating an example of information displayed on a display unit 140.
Figure 22:
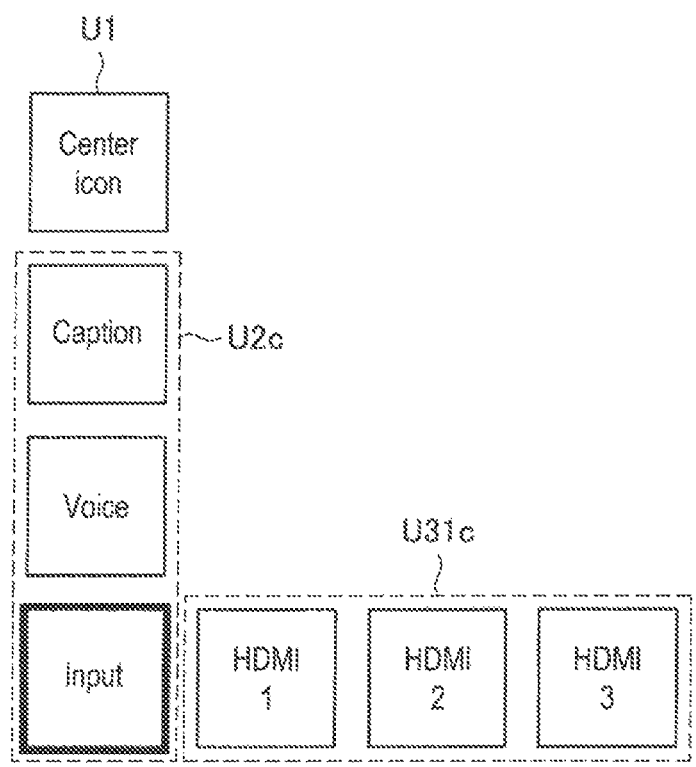
FIG. 22 is an explanatory diagram illustrating an example of information displayed on a display unit 140.

FIGS. 20 to 22 are explanatory diagrams illustrating an example of information displayed on the display unit 140. In FIG. 20, an example in which the user's finger, the stylus pen, or the like is in contact with or in proximity to menu icons U2c including menus for allowing the user to execute a function of changing settings of a caption, voice, and an external input is illustrated. In FIG. 20, a state in which function icons U31c for executing a function of changing the content of the caption are displayed on the display unit 140 through contact with or proximity to an uppermost menu icon performed with the user's finger, the stylus pen, or the like among the menu icons U2c is illustrated.

Likewise, in FIG. 21, a state in which function icons U31c for executing a function of changing the content of the voice are displayed on the display unit 140 through contact with or proximity to a center menu icon performed with the user's finger, the stylus pen, or the like among the menu icons U2c is illustrated. In addition, in FIG. 22, a state in which function icons U31c for executing a function of changing the settings of the external input are displayed on the display unit 140 through contact with or proximity to a lowermost menu icon performed with the user's finger, the stylus pen, or the like among the menu icons U2c is illustrated.

Figure 23:
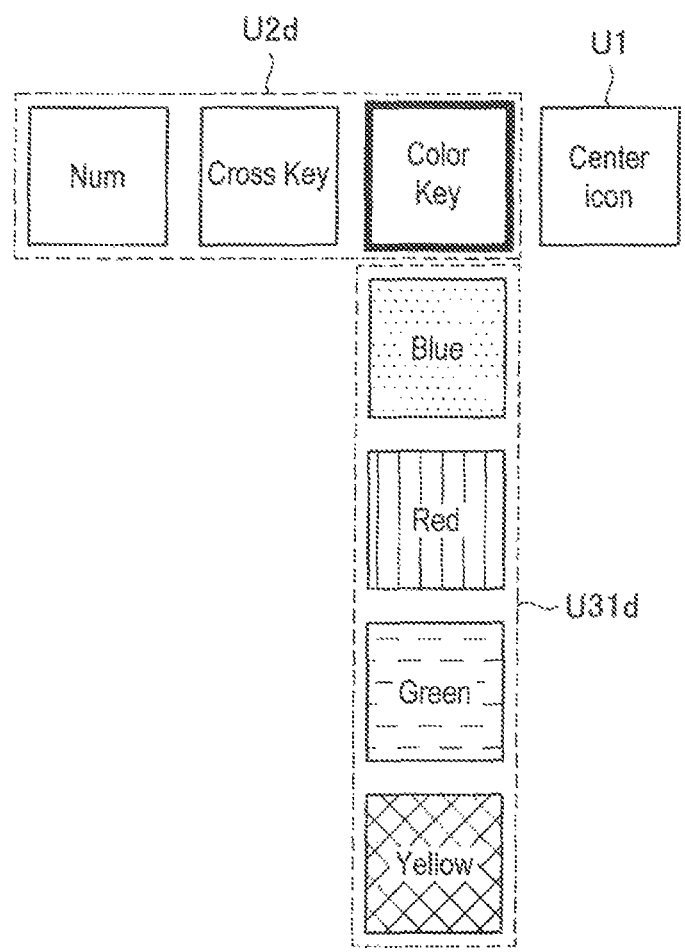
FIG. 23 is an explanatory diagram illustrating an example of information displayed on a display unit 140.
Figure 24:
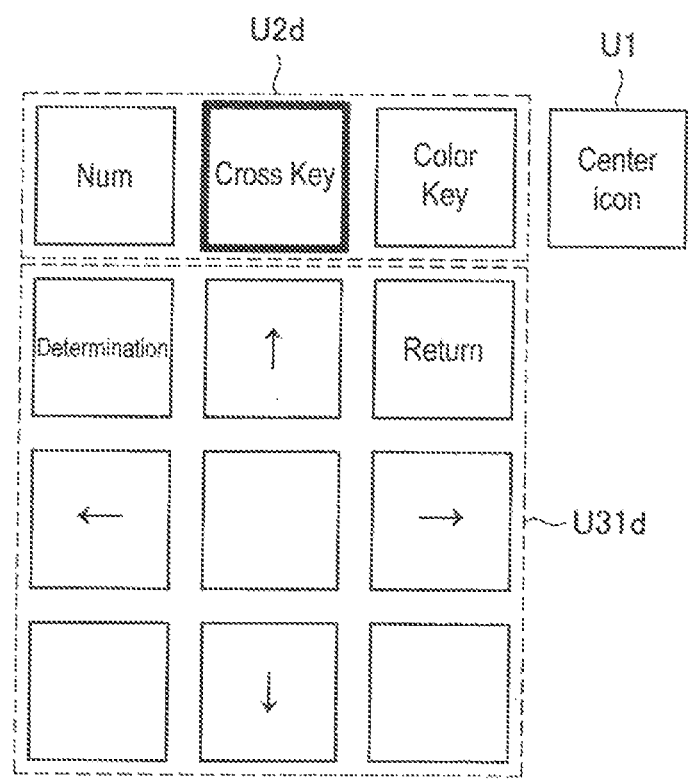
FIG. 24 is an explanatory diagram illustrating an example of information displayed on a display unit 140.
Figure 25:
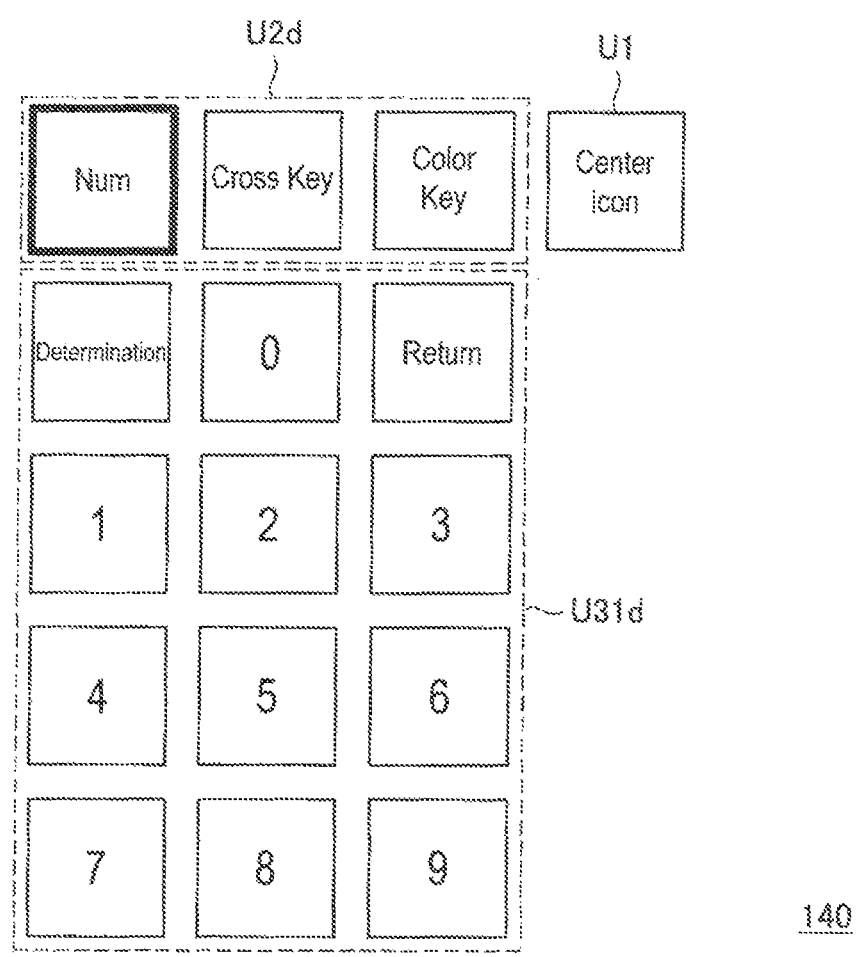
FIG. 25 is an explanatory diagram illustrating an example of information displayed on a display unit 140.

FIGS. 23 to 25 are explanatory diagrams illustrating an example of information displayed on the display unit 140. In FIG. 23, an example in which the user's finger, the stylus pen, or the like is in contact with or in proximity to menu icons U2d including menus for allowing the user to execute a function of manipulating the TV is illustrated. In FIG. 23, a state in which function icons U31d for executing a function of inputting color buttons are displayed on the display unit 140 through contact with or proximity to a rightmost menu icon performed with the user's finger, the stylus pen, or the like among the menu icons U2d is illustrated.

Likewise, in FIG. 24, a state in which function icons U31d for executing a function of manipulating a cursor are displayed on the display unit 140 through contact with or proximity to a center menu icon performed with the user's finger, the stylus pen, or the like among the menu icons U2d is illustrated. In addition, in FIG. 25, a state in which function icons U31d for executing a function of inputting numbers are displayed on the display unit 140 through contact with or proximity to a leftmost menu icon performed with the user's finger, the stylus pen, or the like among the menu icons U2d is illustrated.

The information processing device 100 can allow the user to manipulate the TV by displaying the menu icons and the function icons on the display unit 140 and allowing the user to bring the finger, the stylus pen, or the like in contact with or in proximity to the position at which the menu icons and the function icons are displayed as described above.

An example in which the basic icon, the menu icons, and the function icons are displayed for a plurality of applications has been described above. Of course, it is needless to say that the application for displaying the basic icon, the menu icons, and the function icons is not limited to the above-described applications. The above-described display example of the basic icon, the menu icons, and the function icons can be similarly applied to any application which operates so that only the basic icon is displayed first, the menu icons are displayed in the vicinity of the basic icon according to contact with or proximity to the basic icon, and the function icons are displayed in the vicinity of the menu icon according to contact with or proximity to the menu icon.

When a plurality of basic icons or a plurality of menu icons are displayed in one row or one column in any example described above, the control unit 130 may execute display control so that the icons are sequentially displayed one by one when the icons are displayed.

An example in which the manipulation detection unit 120 detects manipulation content of the user for the manipulation unit 110 (that is, a touch panel provided to be integrated with the display unit 140) and the control unit 130 causes the display unit 140 to display an icon according to the user's manipulation content detected by the manipulation detection unit 120 has been described above, but the present disclosure is not limited to this example. For example, even when the manipulation unit 110 is a mouse and a mouse cursor is displayed on the display unit 140 according to a manipulation of the manipulation unit 110 by the user, the control unit 130 can cause the display unit 140 to display icons according to manipulation content of the user detected by the manipulation detection unit 120.

When the manipulation unit 110 is the mouse and the mouse cursor is displayed on the display unit 140 according to a manipulation of the manipulation unit 110 by the user, the contact of the user's finger, the stylus pen, or the like can correspond to a click of the mouse and the proximity of the user's finger, the stylus pen, or the like can simply correspond to a state in which the mouse cursor is moved.

That is, when the user moves the mouse cursor to a position at which the basic icon is displayed by manipulating the manipulation unit 110 which is the mouse, the control unit 130 causes the display unit 140 to display menu icons on all four sides of a basic icon U1. In addition, when the user manipulates the manipulation unit 110 which is the mouse to move the mouse cursor to any one position among positions at which the menu icons are displayed, the control unit 130 executes a process of causing the display unit 140 to display function icons belonging to the menu icon in the vicinity of the menu icon. Then, when the user manipulates the manipulation unit 110 which is the mouse to align the mouse cursor with any one function icon and clicks the mouse, the control unit 130 can execute a function provided by the function icon.

Also, all of the basic icon, the menu icons, and the function icons are squares in the above-described examples. However, of course, it is needless to say that shapes of the basic icon, the menu icons, and the function icons are not limited to these examples. For example, the shapes of the basic icon, the menu icons, and the function icons may be polygons such as triangles, pentagons, hexagons, or octagons, may be circles, or may be displayed in a cube, a rectangular prism, or another three-dimensional shape. In addition, the menu icons are displayed on all four sides of the square basic icon in the above-described examples, but the present disclosure is not limited to this example. For example, when the basic icon is a polygon such as a hexagon or an octagon, the menu icons may be configured to be displayed in all six or eight directions.

2. HARDWARE CONFIGURATION EXAMPLE

Figure 26:
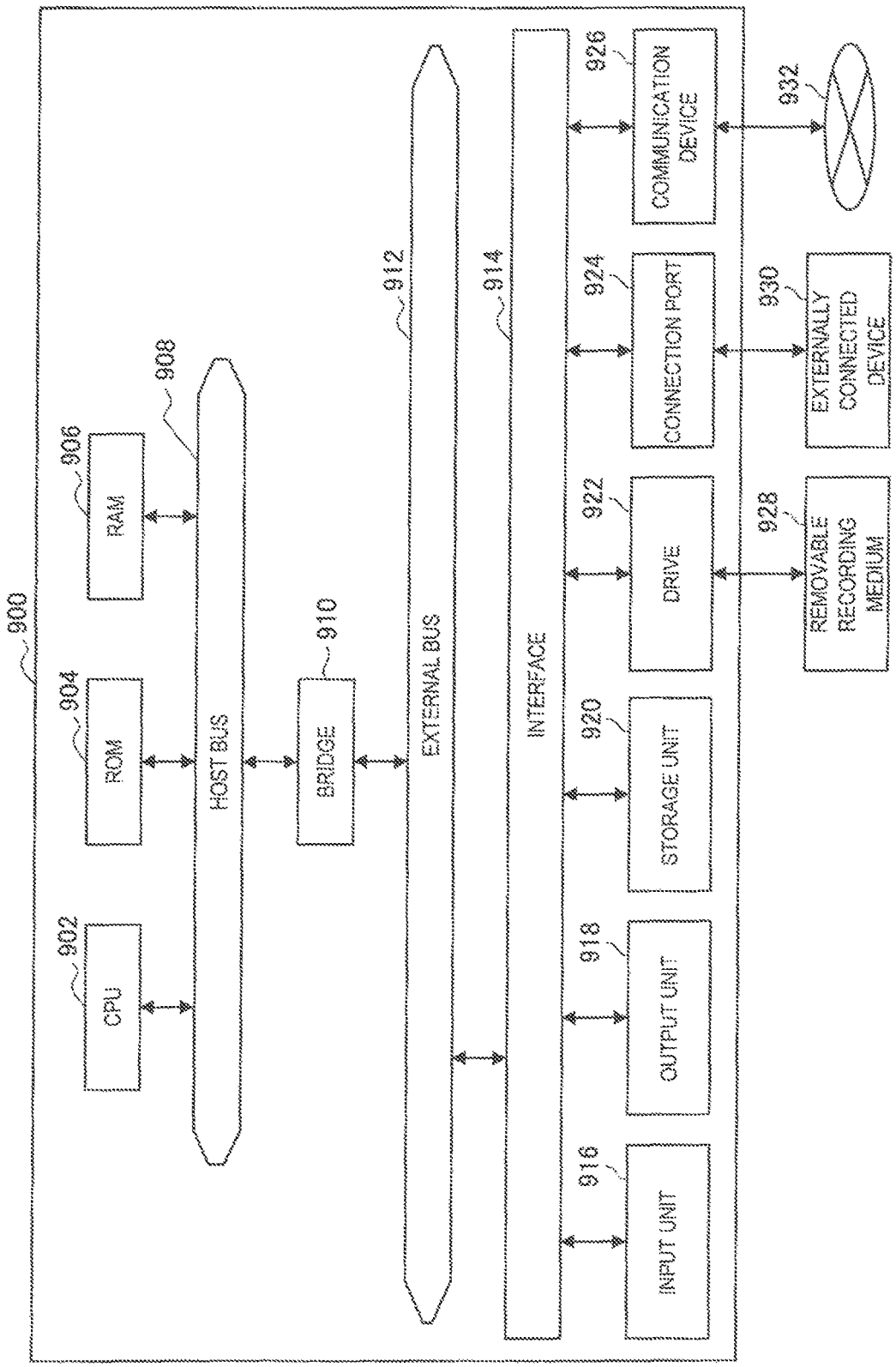
FIG. 26 is an explanatory diagram illustrating a hardware configuration example of the information processing device 100.

An operation of the above-described information processing device 100, for example, can be executed using a hardware configuration of the information processing device illustrated in FIG. 26. That is, the operation of the information processing device 100 may be implemented by controlling the hardware illustrated in FIG. 26 using a computer program. Also, a type of this hardware is arbitrary, and, for example, includes a personal computer, a mobile phone, a portable information terminal such as a PHS or a PDA, a game machine, a contact or non-contact type IC chip, a contact or non-contact type IC card, or various information home appliances. Here, PHS is an abbreviation for Personal Handy-phone System. Also, PDA is an abbreviation for Personal Digital Assistant.

As illustrated in FIG. 26, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Here, CPU is an abbreviation for Central Processing Unit. Also, ROM is an abbreviation for Read Only Memory. RAM is an abbreviation for Random Access Memory.

The CPU 902, for example, functions as an arithmetic processing unit or a control unit and controls all or a part of the operation of each structural element based on various programs recorded on the ROM 904, the RAM 906, the storage unit 920, or a removable recording medium 928. The ROM 904 is means for storing, for example, a program to be read to the CPU 902 or data or the like to be used in an arithmetic operation. The RAM 906 temporarily or permanently stores, for example, a program to be read to the CPU 902 or various parameters or the like which appropriately change at the time of execution of the program.

These structural elements are connected to each other by, for example, the host bus 908 capable of performing high-speed data transmission. The host bus 908, for example, is connected through the bridge 910 to the external bus 912 whose data transmission speed is relatively low. In addition, the input unit 916, for example, is a mouse, a keyboard, a touch panel, a button, a switch, or a lever. Furthermore, a remote controller capable of transmitting a control signal using infrared rays or other radio waves may be used as the input unit 916.

The output unit 918, for example, is a display device such as a CRT, an LCD, a PDP or an ELD, an audio output device such as a speaker or headphones, a printer, a mobile phone, or a facsimile, that can visually or auditorily notify a user of acquired information. Here, CRT is an abbreviation for Cathode Ray Tube. LCD is an abbreviation for Liquid Crystal Display. PDP is an abbreviation for Plasma Display Panel. Furthermore, ELD is an abbreviation for Electro-Luminescence Display.

The storage unit 920 is a device for storing various types of data. The storage unit 920, for example, is a magnetic storage device such as a hard disk drive (HDD), a semiconductor storage device, an optical storage device, or a magneto-optical storage device. Here, HDD is an abbreviation for Hard Disk Drive.

The drive 922, for example, is a device that reads information recorded on the removable recording medium 928 such as a magnetic disk, an optical disc, a magneto-optical disc, or a semiconductor memory, or writes information to the removable recording medium 928. The removable recording medium 928, for example, is a DVD medium, a Blu-ray medium, an HD-DVD medium, various types of semiconductor storage media, or the like. Of course, the removable recording medium 928, for example, may be an electronic device or an IC card on which a non-contact type IC chip is mounted. Here, IC is an abbreviation for Integrated Circuit.

The connection port 924 is a port such as a USB port, an IEEE1394 port, an SCSI, an RS-232C port, or a port for connecting an externally connected device 930 such as an optical audio terminal. The externally connected device 930, for example, is a printer, a mobile music player, a digital camera, a digital video camera, or an IC recorder. Here, USB is an abbreviation for Universal Serial Bus. Also, SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router an ADSL router, or a device for contact or non-contact communication. In addition, the network 932 connected to the communication unit 926 is constituted of a network connected by wire or wirelessly, and, for example, is the Internet, a home-use LAN, infrared communication, visible light communication, broadcasting, or satellite communication, for example. Here, LAN is an abbreviation for Local Area Network. In addition, WUSB is an abbreviation for Wireless USB. ADSL is an abbreviation for Asymmetric Digital Subscriber Line.

For example, when the information processing device 100 has the above-described hardware configuration, for example, the CPU 902 can perform the function of the manipulation detection unit 120 or the control unit 130. In addition, for example, the input unit 916 can perform the function of the manipulation unit 110. In addition, for example, the input unit 916 can perform the function of the manipulation unit 110 and the ROM 904, the RAM 906, the storage unit 920, or the removable recording medium 928, for example, can perform the function of the storage unit 150. In addition, for example, the output unit 918 can perform the function of the display unit 140. In addition, for example, the communication unit 926 can perform the function of the communication unit 160.

3. CONCLUSION

According to an embodiment of the present disclosure as described above, the information processing device 100 for executing applications sequentially displayed in order of a basic icon, a menu icon, and a function icon according to the user's manipulation is provided.

The information processing device 100 according to an embodiment of the present disclosure is in a state in which only the basic icon is displayed after activation of the application and the user's manipulation is received. When the user executes a manipulation on the basic icon, the information processing device 100 is in a state in which the menu icons are displayed on all four sides of the basic icon according to the manipulation on the basic icon and the user's manipulation is received.

When the user executes the manipulation on the menu icon, the information processing device 100 is in a state in which function icons are displayed in a direction orthogonal to a direction from the basic icon to its menu icon according to a manipulation on the menu icon and the user's manipulation is received. In addition, the information processing device 100 deletes the menu icons other than the menu icon selected by the user from the screen.

The information processing device 100 according to the embodiment of the present disclosure executes a function of providing the function icon according to the user's selection on the function icon in a state in which the basic icon, the menu icons, and the function icons are displayed. The information processing device 100 according to the embodiment of the present disclosure can have the above-described configuration to improve manipulability for the user while efficiently displaying a menu on the screen.

For example, it is not necessarily necessary to perform the steps in the processing of each device in this specification in chronological order according to the sequence shown in the flowcharts. For example, the steps in the processing of each device may be processed in a sequence different from the sequence shown in the flowchart or processed in parallel.

In addition, it is also possible to create a computer program that causes hardware such as a CPU, a ROM and a RAM incorporated into each device to perform the equivalent functions to the elements of each device described above. In addition, a recording medium in which such a computer program is stored can also be provided. In addition, each functional block illustrated in the functional block diagrams can be configured by the hardware, so that a series of processes may be implemented in hardware.

The preferred embodiment(s) of the present disclosure has/have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Additionally, the present technology may also be configured as below.

(1)

An information processing device including:

a detection unit configured to detect a position of a manipulating object; and a display control unit configured to cause a menu to be displayed on a screen according to the position of the manipulating object detected by the detection unit, wherein the display control unit causes, when the detection unit detects that the manipulating object is positioned on a first icon serving as a base point, one or more second icons corresponding to a main menu to be opened on at least four sides of the first icon and displayed, and causes, when the detection unit detects that the manipulating object is positioned on one of the second icons, one or more third icons corresponding to a sub-menu subordinate to the main menu to be opened in a direction orthogonal to an opening direction of the second icons and displayed by using the selected second icon as a base point.

(2)

The information processing device according to (1), wherein the display control unit causes one or more second icons having similar functions and corresponding to the main menu to be opened in the same direction from the first icon serving as the base point and displayed.

(3)

The information processing device according to (1) or (2), wherein the display control unit causes, when the detection unit detects that the manipulating object is positioned on one of the second icons, the other second icons to refrain from being displayed.

(4)

The display control device according to any of (1) to (3), wherein the display control unit causes the one or more third icons corresponding to the sub-menu for performing a first manipulation to be displayed in a predetermined direction and causes the third icon for performing a second manipulation opposite to the first manipulation to be displayed in a direction opposite to the predetermined direction.

(5)
The display control device according to (4), wherein the display control unit causes an object for designating the number of times the first manipulation and the second manipulation are executed to be displayed on the screen.

(6)
The display control device according to (4), wherein the display control unit causes an object for designating manipulation amounts by the first manipulation and the second manipulation to be displayed on the screen.

(7)
The display control device according to any of (1) to (6), wherein the display control unit causes the third icon to be animated when the third icon corresponding to the sub-menu is replaced by performing switching from the main menu to another main menu which is the same as or similar to the main menu.

(8)
The display control device according to (7), wherein the display control unit causes the third icon to be animated without changing a region.

(9)
The display control device according to any of (1) to (8), wherein the display control unit causes all the second icons corresponding to the main menu to be opened on the four sides of the first icon and displayed when the detection unit detects that the manipulating object is positioned on the first icon.

(10)
The display control device according to any of (1) to (8), wherein the display control unit causes only one second icon corresponding to the main menu to be opened on the four sides of the first icon and displayed when the detection unit detects that the manipulating object is positioned on the first icon.

(11)
The display control device according to any of (1) to (10), wherein the display control unit enables the first icon to move according to movement of the manipulating object when it is detected that the manipulating object is positioned on the first icon for a predetermined time or more.

(12)
The display control device according to any of (1) to (11), wherein the manipulating object manipulates a touch panel provided in the screen, and
wherein the detection unit detects that a selection manipulation is performed on the first, second, and third icons when it is detected that the manipulating object is in proximity to an upper part of a position at which the first, second, and third icons are displayed.

(13)
The display control device according to any of (1) to (12), wherein the manipulating object manipulates a touch panel provided in the screen, and
wherein the detection unit detects that an execution manipulation is performed on the first, second, and third icons when it is detected that the manipulating object is in contact with an upper part of a position at which the first, second, and third icons are displayed.

(14)
The display control device according to any of (1) to (13), wherein, when the detection unit detects a predetermined manipulation by the manipulating object, the display control unit refrains from changing display even when a manipulation is performed on the first, second, and third icons.

(15)
An information processing method including:
detecting a position of a manipulating object; and
causing a menu to be displayed on a screen according to the position of the manipulating object detected,
wherein causing the menu to be displayed includes
causing, when it is detected that the manipulating object is positioned on a first icon serving as a base point in the detecting step, one or more second icons corresponding to a main menu to be opened on at least four sides of the first icon and displayed, and
causing, when it is detected that the manipulating object is positioned on one of the second icons in the detecting step, one or more third icons corresponding to a sub-menu subordinate to the main menu to be opened in a direction orthogonal to an opening direction of the second icons and displayed by using the selected second icon as a base point.

(16)
A computer program for causing a computer to execute:
detecting a position of a manipulating object; and
causing a menu to be displayed on a screen according to the position of the manipulating object detected,
wherein causing the menu to be displayed includes
causing, when it is detected that the manipulating object is positioned on a first icon serving as a base point in the detecting step, one or more second icons corresponding to a main menu to be opened on at least four sides of the first icon and displayed, and
causing, when it is detected that the manipulating object is positioned on one of the second icons in the detecting step, one or more third icons corresponding to a sub-menu subordinate to the main menu to be opened in a direction orthogonal to an opening direction of the second icons and displayed by using the selected second icon as a base point.

REFERENCE SIGNS LIST

100 information processing device
110 manipulation unit
120 manipulation detection unit
130 control unit
140 display unit
150 storage unit
160 communication unit

The invention claimed is:
1. An information processing device, comprising: a central processing unit (CPU) configured to:
detect a position of a manipulating object on a screen;
display a first icon on the screen based on the detected position of the manipulating object, wherein the first icon corresponds to a menu;
display a plurality of second icons on at least one side of the first icon based on a first detection that the position of the manipulating object is on the first icon,
wherein a second icon of the plurality of second icons corresponds to a first main menu of the menu and a third icon of the plurality of second icons corresponds to a second main menu of the menu, and wherein the second icon and the third icon have a same label;
display at least one fourth icon in a direction orthogonal to a direction of the display of the plurality of second icons, wherein the display of the at least one fourth icon is based on a second detection that the position of the manipulating object is on the second icon of the plurality of second icons, wherein the at least one fourth icon corresponds to a first sub-menu of the menu, and wherein the first sub-menu is subordinate to the first main menu;

execute a function associated with the at least one fourth icon based on a third detection that the position of the manipulating object is on the at least one fourth icon;

rotate the at least one fourth icon based on a fourth detection that the position of the manipulating object is on the third icon; and change the at least one fourth icon to at least one fifth icon based on the rotation of the at least one fourth icon, wherein the at least one fifth icon corresponds to a second sub-menu of the menu, and wherein the second sub menu is subordinate to the second main menu.

2. The information processing device according to claim 1, wherein the CPU is further configured to display similar function icons of the plurality of second icons in a same direction from the first icon.

3. The information processing device according to claim 1, wherein the CPU is further configured to:
retain display of one of the plurality of second icons based on a fifth detection that the position of the manipulating object is on the one of the plurality of second icons; and
refrain display of remaining icons of the plurality of second icons based on the fifth detection that the position of the manipulating object is on the one of the plurality of second icons.

4. The information processing device according to claim 1, wherein the CPU is further configured to:
display a plurality of third icons;
display a sixth icon of the plurality of the third icons in a first direction, wherein the sixth icon is associated with a first manipulation; and
display a seventh icon of the plurality of the third icons in a second direction opposite to the first direction, wherein the seventh icon is associated with a second manipulation opposite to the first manipulation.

5. The information processing device according to claim 4, wherein the CPU is further configured to display an object to designate a number of times of execution of each of the first manipulation and the second manipulation.

6. The information processing device according to claim 4, wherein the CPU is further configured to display an object to designate manipulation amounts of each of the first manipulation and the second manipulation.

7. The information processing device according to claim 1, wherein the CPU is further configured to rotate the at least one fourth icon and display the at least one fifth icon in a same display region of the screen.

8. The information processing device according to claim 1, wherein the CPU is further configured to display at least four icons of the plurality of second icons on four sides of the first icon based on the first detection.

9. The information processing device according to claim 1, wherein the CPU is further configured to display the plurality of second icons on each side of the first icon based on the first detection.

10. The information processing device according to claim 1, wherein the CPU is configured to move the first icon based on the first detection that the position of the manipulating object is on the first icon for a determined time or more and based on a movement of the manipulating object.

11. The information processing device according to claim 1, wherein the CPU is further configured to:
detect the position of the manipulating object based on a manipulation on a touch panel associated with the screen; and detect a selection manipulation of at least one of the first icon, the plurality of second icons, or the at least one fourth icon based on a fifth detection of the manipulating object within a determined distance from an upper part of display positions of the first icon, the plurality of second icons, and the at least one fourth icon.

12. The information processing device according to claim 1, wherein the CPU is further configured to:
detect the position of the manipulating object based on a manipulation on a touch panel associated with the screen; and
detect an execution manipulation of at least one of the first icon, the plurality of second icons, or the at least one fourth icon based on a fifth detection that the manipulating object is in contact with an upper part of display positions of the first icon, the plurality of second icons, and the at least one fourth icon.

13. The information processing device according to claim 1, wherein the CPU is further configured to:
detect a determined manipulation of the manipulating object; and
refrain a change of the display of each of the first icon, the plurality of second icons, and the at least one fourth icon, based on the determined manipulation.

14. An information processing method, comprising:
in an information processing device:
detecting a position of a manipulating object on a screen;
displaying a first icon on the screen based on the detected position of the manipulating object, wherein the first icon corresponds to a menu;
displaying a plurality of second icons on at least one side of the first icon based on a first detection that the position of the manipulating object is on the first icon, wherein a second icon of the plurality of second icons corresponds to a first main menu of the menu and a third icon of the plurality of second icons corresponds to a second main menu of the menu, and wherein the second icon and the third icon have a same label;
displaying at least one fourth icon in a direction orthogonal to a direction of the display of the plurality of second icons, wherein the display of the at least one fourth icon is based on a second detection that the position of the manipulating object is on the second icon of the plurality of second icons, wherein the at least one fourth icon corresponds to a first sub-menu of the menu, and wherein the first sub-menu is subordinate to the first main menu;
executing a function associated with the at least one fourth icon based on a third detection that the position of the manipulating object is on the at least one fourth icon;
rotating the at least one fourth icon based on a fourth detection that the position of the manipulating object is on the third icon; and
changing the at least one fourth icon to at least one fifth icon based on the rotation of the at least one fourth icon, wherein the at least one fifth icon corresponds to a second sub-menu of the menu, and wherein the second sub menu is subordinate to the second main menu.

15. A non-transitory computer-readable storage medium having stored thereon, computer-executable instructions, which when executed by an information processing device, cause the information processing device to execute operations, the operations comprising:
detecting a position of a manipulating object on a screen;

displaying a first icon on the screen based on the detected position of the manipulating object, wherein the first icon corresponds to a menu;

displaying a plurality of second icons on at least one side of the first icon based on a first detection that the position of the manipulating object is on the first icon, wherein a second icon of the plurality of second icons corresponds to a first main menu of the menu and a third icon of the plurality of second icons corresponds to a second main menu of the menu, and wherein the second icon and the third icon have a same label;

displaying at least one fourth icon in a direction orthogonal to a direction of the display of the plurality of second icons, wherein the display of the at least one fourth icon is based on a second detection that the position of the manipulating object is on the second icon of the plurality of second icons, wherein the at least one fourth icon corresponds to a first sub-menu of the menu, and wherein the first sub-menu is subordinate to the first main menu;

executing a function associated with the at least one fourth icon based on a third detection that the position of the manipulating object is on the at least one fourth icon;

rotating the at least one fourth icon based on a fourth detection that the position of the manipulating object is on the third icon; and changing the at least one fourth icon to at least one fifth icon based on the rotation of the at least one fourth icon, wherein the at least one fifth icon corresponds to a second sub-menu of the menu, and wherein the second sub-menu is subordinate to the second main menu.

* * * * *